US011428366B2

(12) United States Patent
Ahi

(10) Patent No.: US 11,428,366 B2
(45) Date of Patent: *Aug. 30, 2022

(54) CELL PHONE CONNECTOR

(71) Applicant: Kiarash Ahi, San Jose, CA (US)

(72) Inventor: Kiarash Ahi, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,493

(22) Filed: Dec. 8, 2020

(65) Prior Publication Data
US 2021/0088181 A1 Mar. 25, 2021

Related U.S. Application Data

(63) Continuation of application No. 16/459,612, filed on Jul. 2, 2019, now Pat. No. 10,900,608, which is a (Continued)

(51) Int. Cl.
*F16M 13/06* (2006.01)
*F16M 13/04* (2006.01)
(Continued)

(52) U.S. Cl.
CPC ........... *F16M 13/06* (2013.01); *A44C 5/0007* (2013.01); *A45F 5/021* (2013.01);
(Continued)

(58) Field of Classification Search
CPC ..... B60R 2011/0008; B60R 2011/0059; B60R 11/02; B60R 11/0241; B60R 11/00; B60R 2011/007; B60R 2011/0071
(Continued)

(56) References Cited

U.S. PATENT DOCUMENTS 3,913,147 A * 10/1975 Ostrander .............. A44B 11/22
2/325
4,941,236 A * 7/1990 Sherman .............. A44C 5/2071
24/265 WS
(Continued)

*Primary Examiner* — Corey N Skurdal

(57) ABSTRACT

A mobile phone holder is disclosed for mounting a mobile phone to the dashboard of a car. This mobile phone holder is integrated into the back of a mobile phone or is attached to the back surface of the mobile phone through adhesive pads, or suction cups, or is incorporated into accessories of mobile phones such as attachable card holding wallets, and etc. One embodiment of this mobile phone holder creates a closed loop around the air vent bars. Hence, shakes of the car will not cause sudden detachment and falling of the phone. In Addition, this mobile phone holder is portable and is carried by the mobile phone. Hence, the user can readily have it upon using a temporary car. Moreover, since this mobile phone holder is not permanently stayed in the car, it is not exposed to extreme temperatures and thus its wear and tear is lower than conventional phone holders. The loop that is formed by this apparatus can also be used for mounting a mobile phone to the handlebar of a shopping cart, the handlebar of a bike, safety belt of a car, a belt loop, belt of a user, strap of a bag, or other accessories of a user. This apparatus can also be used as a general purpose fastener for fastening two or more objects together, hanging objects from a bar. Such general purpose fastener can be used as a toy, strap of a watch, or bracelet as well.

28 Claims, 38 Drawing Sheets

Related U.S. Application Data continuation-in-part of application No. 16/404,759, filed on May 7, 2019, now abandoned.

(60) Provisional application No. 62/816,219, filed on Mar. 11, 2019.

(51) Int. Cl.

| | |
|---|---|
| *B60R 11/02* | (2006.01) |
| *B62B 5/00* | (2006.01) |
| *B62J 11/00* | (2020.01) |
| *F16M 13/02* | (2006.01) |
| *F16M 13/00* | (2006.01) |
| *B62J 99/00* | (2020.01) |
| *A44C 5/00* | (2006.01) |
| *A45F 5/02* | (2006.01) |
| *F16L 3/137* | (2006.01) |
| *B60R 11/00* | (2006.01) |
| *B65D 63/00* | (2006.01) |
| *A63H 3/36* | (2006.01) |
| *A63H 3/02* | (2006.01) |
| *B62J 45/10* | (2020.01) |

(52) U.S. Cl.
CPC ............ *B60R 11/0241* (2013.01); *B62B 5/00* (2013.01); *B62J 11/00* (2013.01); *B62J 99/00* (2013.01); *F16M 13/005* (2013.01); *F16M 13/022* (2013.01); *F16M 13/04* (2013.01); *A45F 2200/0516* (2013.01); *A63H 3/02* (2013.01); *A63H 3/36* (2013.01); *B60R 2011/0008* (2013.01); *B60R 2011/0031* (2013.01); *B60R 2011/0059* (2013.01); *B60R 2011/0068* (2013.01); *B60R 2011/0077* (2013.01); *B62J 45/10* (2020.02); *B65D 63/00* (2013.01); *F16L 3/137* (2013.01)

(58) Field of Classification Search
USPC .......................................................... 224/483
See application file for complete search history.

(56) References Cited

U.S. PATENT DOCUMENTS

| | | | | |
|---|---|---|---|---|
| 2010/0219217 | A1* | 9/2010 | Andochick | ............... A45F 5/02 224/250 |
| 2015/0182009 | A1* | 7/2015 | Whang | ..................... A45F 5/00 224/222 |
| 2016/0345695 | A1* | 12/2016 | Stagge | .................... A45C 11/00 |
| 2016/0359513 | A1* | 12/2016 | Alvarez, III | ............ B60R 11/02 |
| 2016/0373152 | A1* | 12/2016 | Schmidt | ............... H04B 1/3877 |
| 2017/0072872 | A1* | 3/2017 | Balmer | ................ F16M 13/022 |
| 2017/0155418 | A1* | 6/2017 | Kim | ..................... F16M 13/022 |
| 2019/0216195 | A1* | 7/2019 | Stagge | ................. H04B 1/3877 |

* cited by examiner

Figure 8:
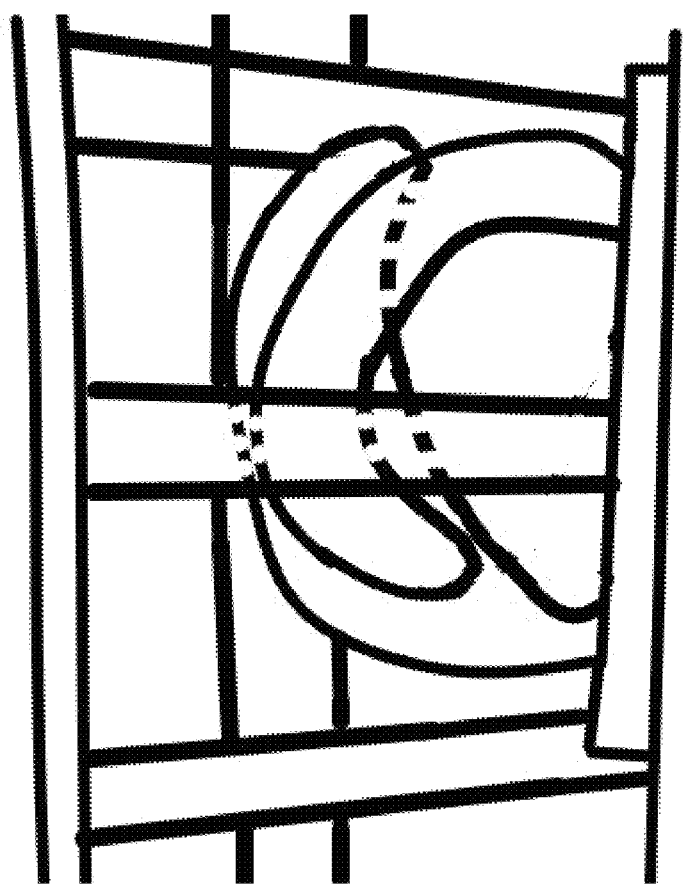

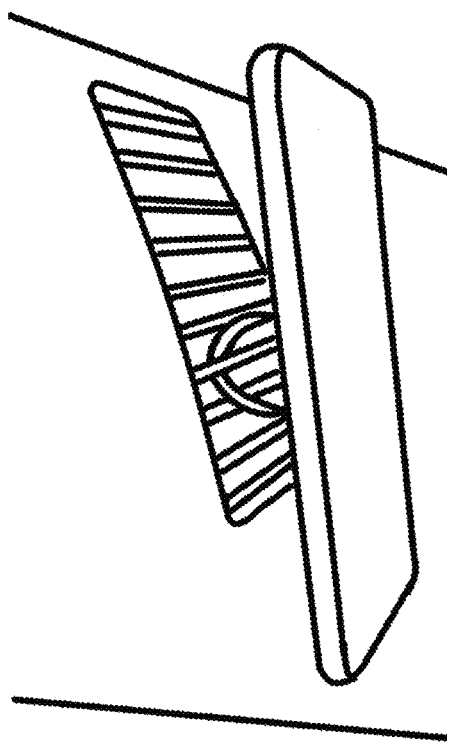
Fig. 8. B.

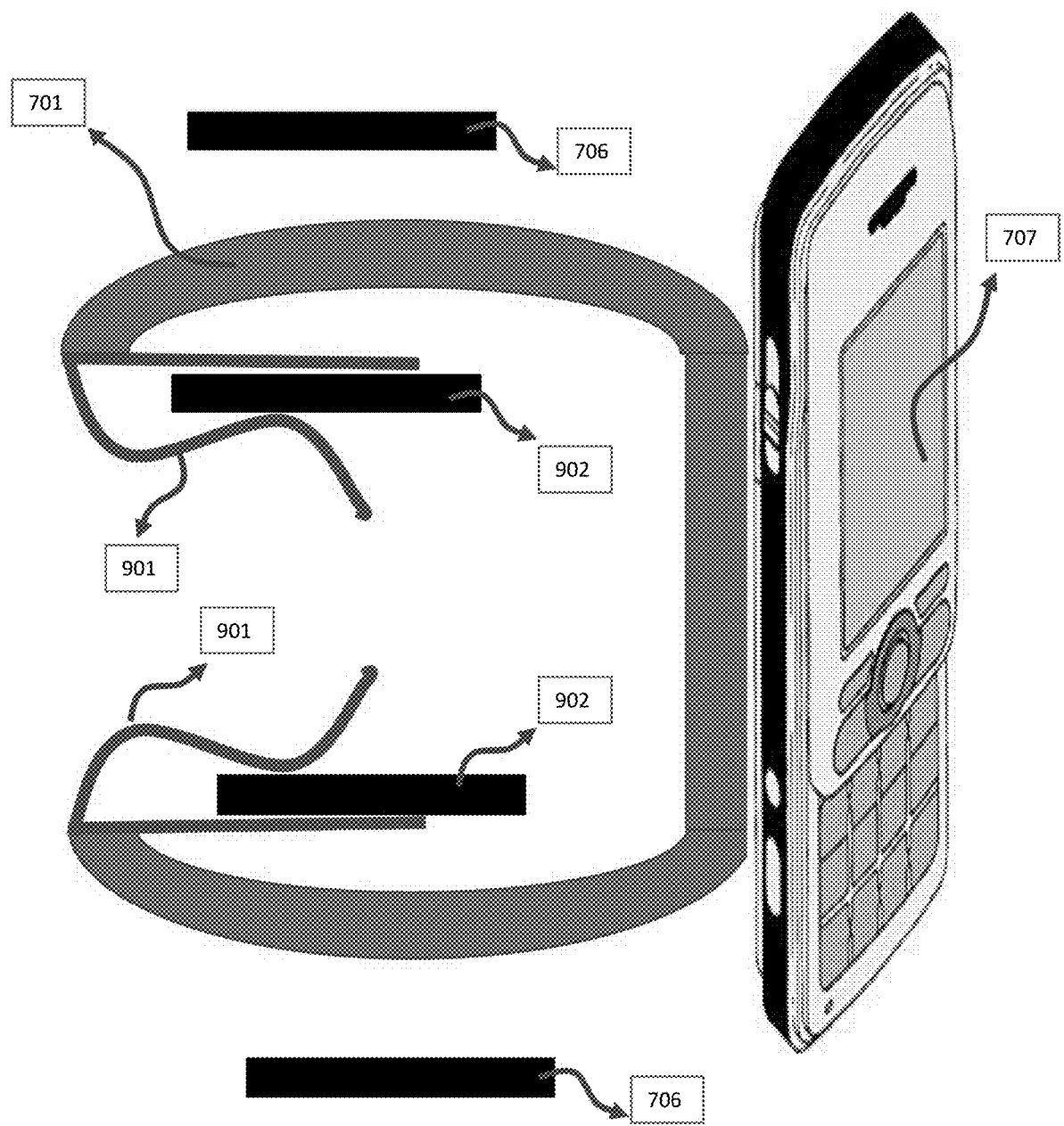
Fig. 9. A.

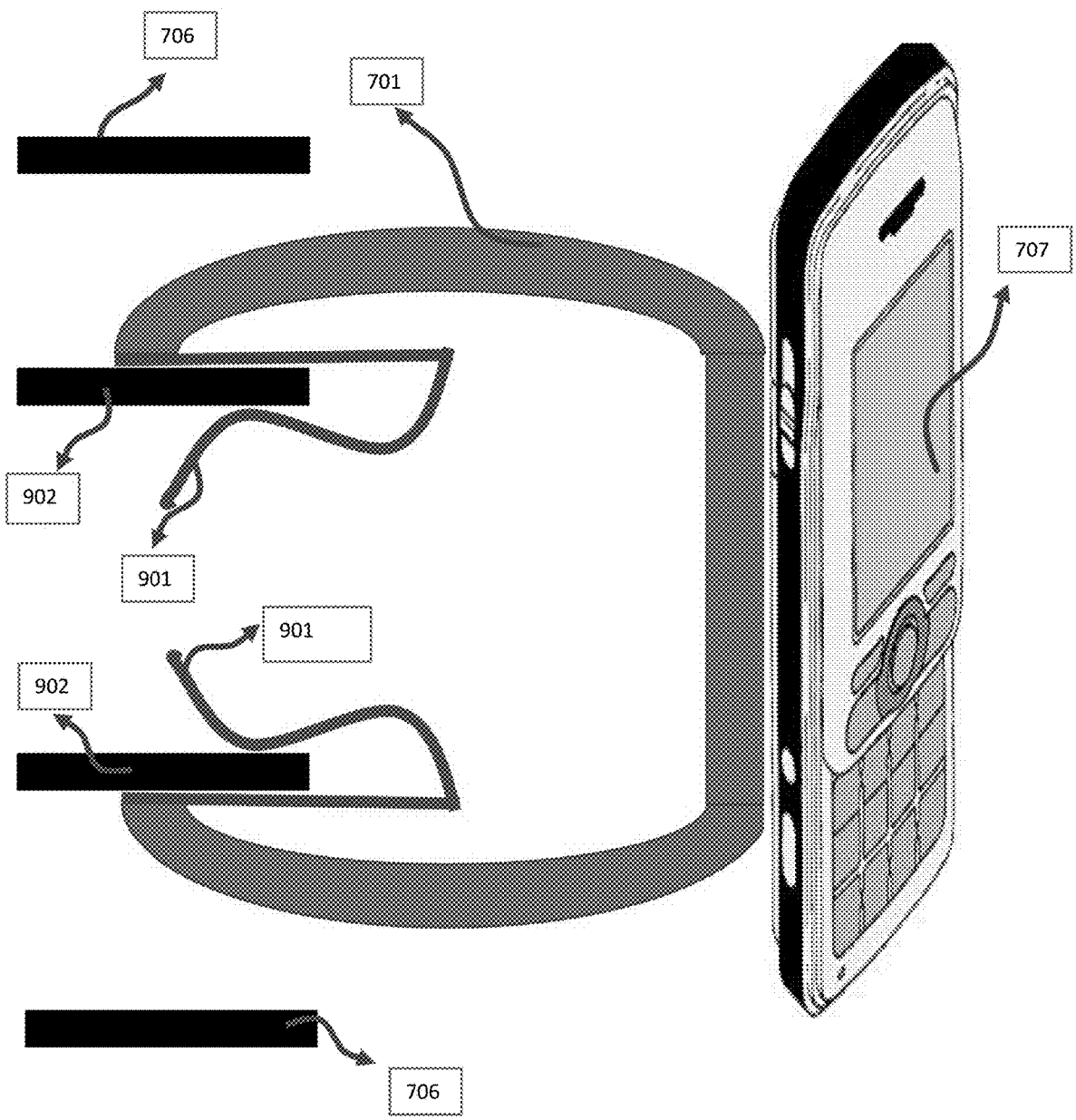
Fig. 9. B.

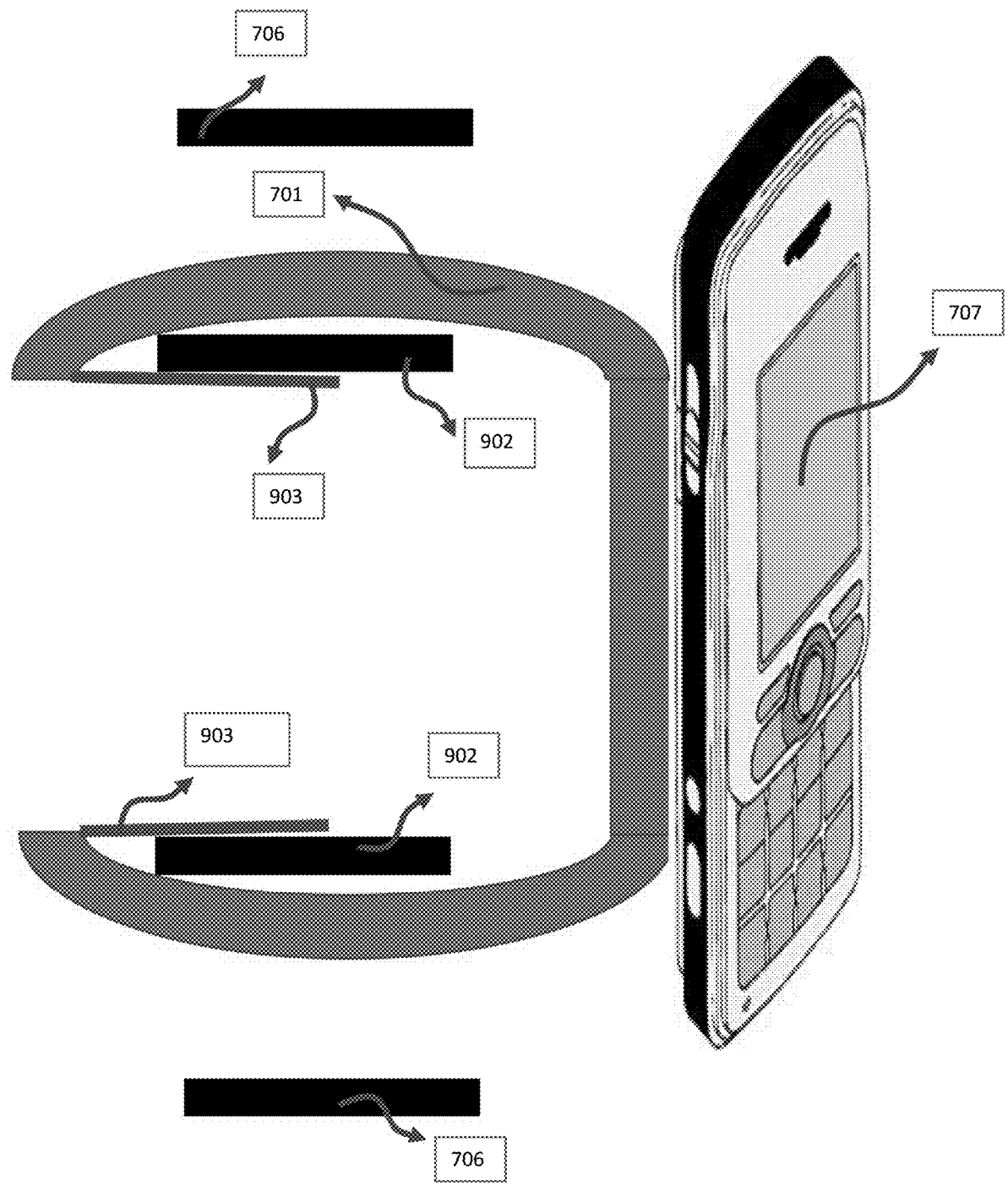
Fig. 9. C.

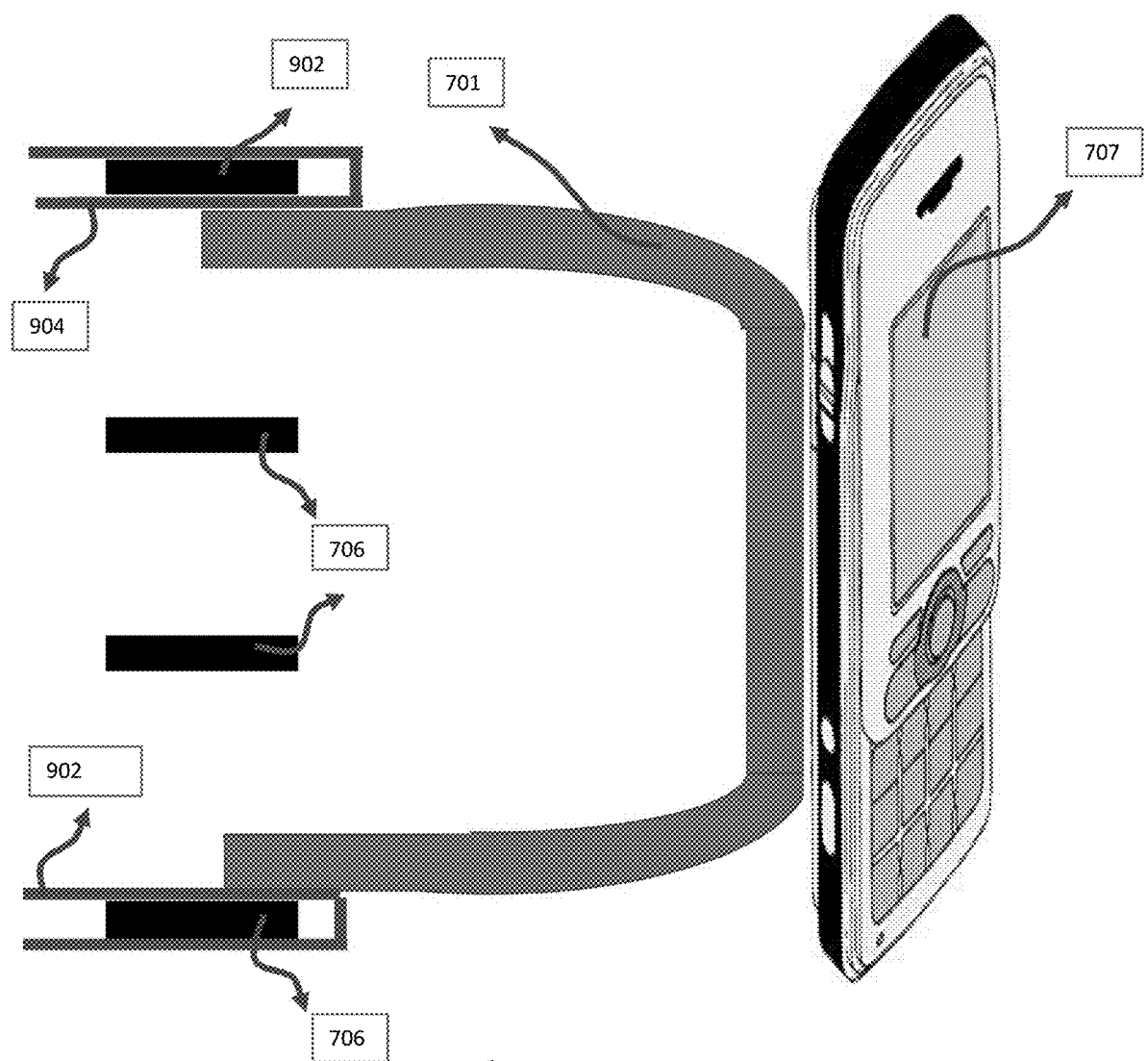
Fig. 9. D.

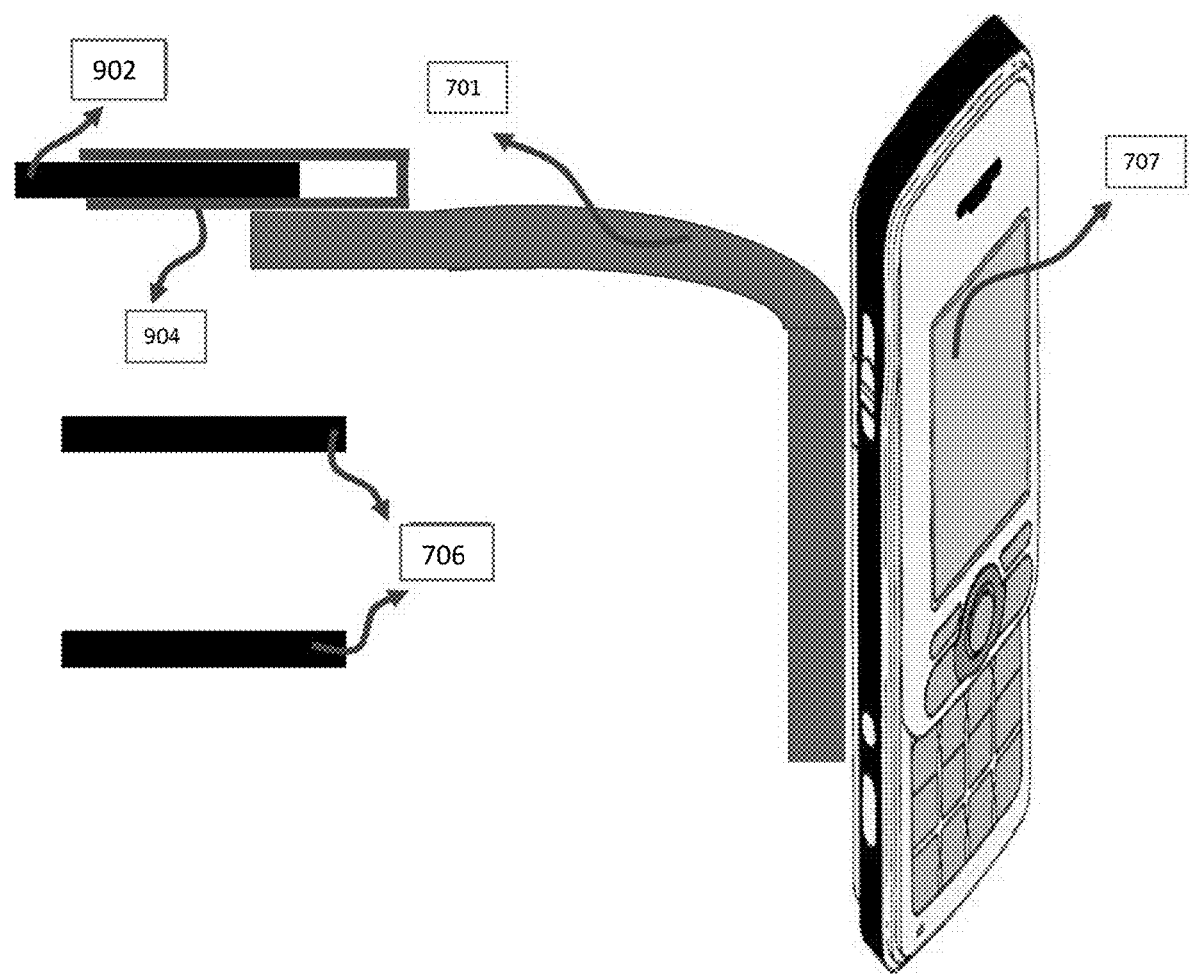
Fig. 9. E.

CELL PHONE CONNECTOR

CROSS REFERENCES TO RELATED APPLICATIONS

This application is a Continuation of Ser. No. 16/459,612, filed Jul. 2, 2019 by the present inventor which is a CIP of Ser. No. 16/404,759, filed May 7, 2019 by the present inventor which claims the benefit of provisional application Ser. No. 62/816,219, filed Mar. 11, 2019 by the present inventor.

FIELD OF INVENTION

The present invention relates to a mobile phone holder.
Field of Search: A45F 5/00, A45F 2005/008, A45F 2200/0516, D14/138R, B60R 2011/0008, F16M 11/00, F16M 11/04, F16M 11/041, 379/454

Background—Prior Art

The following is a tabulation of some prior art that presently appear relevant:

| U.S. Patents | | |
| --- | --- | --- |
| Pat. No. | Issue Date | Patentee |
| 6,454,146 B2 | Sep. 24, 2002 | Alis |
| 6,285,758 | Sep. 4, 2001 | Lu |
| 5,836,563 | Nov. 17, 1998 | Hsin-Yung |
| 5,779,205 | Jul. 14, 1998 | Ching |
| 10,173,607 B1 | Jan. 8, 2019 | Omelchenko, et al. |
| 7,857,178 B2 | Dec. 28, 2010 | Brown |

Background Art and Technical Problem

The majority of currently available gadgets for mounting a mobile phone to dashboard of a car are consisting of a part made of rubber, or a plastic, that connects to a part of the dashboard through either a suction cup or through friction cussed by clamps or clips. Said gadgets, or at least one part of them, normally stays in the car and is not carried by the user along with the mobile phone. The temperature in the car can become extremely hot and cold. Such extreme temperature causes damage to said gadget and especially to its rubber and plastic parts. Since said available gadgets are consisting of at least one part that is not portable and is not normally attached to the mobile phone when the user carries the mobile phone, when the user is having a temporary or rental car, it will not be possible to mount his or her mobile phone to the dashboard of such car, unless the user carries all parts of said gadget; which would be unusual and inconvenient.

Currently, there are two major types of mobile phone holders mentioned in patents and available in the market that mount a mobile phone to dashboard of a car: (1) magnetic mobile phone holders and (2) clamp-like mobile phone holders.

(1) Magnetic phone holders have two parts, one part that is connected to the dashboard through either rubber clamps or rubber suction cups, and a second part that is an adhesive metallic plate which adheres to the back of the mobile phone. Besides the problems that were mentioned earlier in this section about wear and tear of the part that stays in the car and is exposed to extreme heat or cold, the strong shakes in the car can cause the phone to be detached from the magnet; resulting in the distraction of the driver. In addition, attachable mobile phone card holding wallets cover said adhesive metallic plate and prevent such phone holders to work properly. In other words, the user cannot use the attachable mobile phone card holding wallets if he or she wants to use said magnetic phone holders.

(2) Clamp-like phone holders hold the mobile phone in a similar way that a clamp holds objects. Clamp-like phone holders are attached to the dashboard through either rubber clamps or rubber suction cups. The user mounts the mobile phone inside these clamp-like phone holders in a similar way that objects are placed inside clamps. Besides the problems that were mentioned earlier in this section about the wear and tear of the rubber or plastic part that normally stays in the car and is exposed to extreme heat or cold, if the user is using protective covers or attachable mobile phone card holding wallets on his or her mobile phone, and as a result the thickness of the mobile phone is increased, these clamp-like phone holders won't be able to hold the mobile phone firmly.

In addition to the problems that were mentioned earlier, none of the currently available mobile phone holders attach the mobile phone through a closed loop to the dashboard of a car. Hence, they cause unexpected and sudden ejection and falling of the mobile phone off the dashboard. This causes sudden distraction for the driver and can cause accidents.

To solve the mentioned problems, this disclosure proposes using closed loops around air vent bars for holding mobile phones on the dashboard. In addition, the disclosed phone holder in this disclosure is portable and is normally attached to the mobile phone when the user carries the mobile phone. Hence, the user has it readily when he or she uses a temporary car. This phone holder also provides a stand and a handle for the user to hold the phone.

Solution to Problem

This disclosure presents a novel method and apparatus for mounting a mobile phone to dashboard of a car. This apparatus is integrated into the back of the case of the mobile phone (or the protective cover of the mobile phone) or is attached to the back surface of the mobile phone through adhesive pads or suction cups, or is incorporated into accessories of mobile phones such as attachable card holding wallets, and etc. One embodiment of this apparatus creates a closed loop around the air vent bars, or other parts of dashboard of a car. By using this apparatus, the mobile phone is attached to the dashboard through a closed loop and hence, shakes of the car will not cause sudden detachment and falling of the phone from the dashboard. The phone will not get detached from the dashboard unless the user detaches it intentionally. Another embodiment of this apparatus connects the phone to the air vent bars through at least one piece of bistable spring, or strap, that is attached to the mobile phone and at least one piece of fastening means such as a brass fastener, or a set of two parallel rings, or a set of two parallel plates that grip an air vent bar. Since this mobile phone holder is directly incorporated to the case of the mobile phone, or is attached to the back of the mobile phone, this mobile phone holder is not staying in the car when the user leaves the car. As a result, it is not exposed to extreme temperature and sunshine for a long duration of time, and hence, its wear and tear is lower than the currently available mobile phone holders that are not portable. Since this apparatus is carried by the user, is visible and accessible to the user and has less complexity compared with the mobile phone holders in prior art, this apparatus is easy to be inspected by the user. In addition, since this mobile phone holder is portable and is normally attached to the mobile phone when the user carries the mobile phone, the user has it readily when the user uses a temporary or rental car. This mobile phone holder also provides a stand and a handle for the user to hold the mobile phone. As a result of the mentioned characteristics, in this disclosure, a robust phone holder for mounting a mobile phone to the dashboard of a car is introduced which results in preventing sudden falling of the phone from the dashboard reducing the risk of distractions and accidents. Additional advantages of this mobile phone holder are mentioned in the "Advantages" section and throughout this disclosure. Other advantages of one or more aspects will be apparent from the consideration of the drawings and ensuring description.

SUMMARY

This disclosure presents a novel method and apparatus for mounting a mobile phone to dashboard of a car. This apparatus is integrated into the back surface of the mobile phone (or the protective cover of the mobile phone) or is attached to the back of the mobile phone through adhesive pads or suction cups, or is incorporated into accessories of mobile phones such as attachable card holding wallets, and etc. One embodiment of this apparatus creates a closed loop around the air vent bars. By using this apparatus, the mobile phone is attached to the dashboard through a closed loop and hence, shakes of the car will not cause sudden detachment and falling of the mobile phone. The phone will not be detached from the dashboard unless the user detaches it intentionally. Another embodiment of this apparatus connects the phone to the air vent bars through at least one piece of bistable spring, or strap, that is attached to the mobile phone and at least one piece of fastening means such as a brass fastener, or a set of two parallel rings, or a set of two parallel plates and etc. that grips an air vent. Since this mobile phone holder is directly incorporated to the case of the mobile phone, or is attached to the back surface of the mobile phone, this mobile phone holder is not staying in the car when the user leaves the car. As a result, it is not exposed to extreme temperature and sunshine for a long duration of time, and hence, its wear and tear is lower than the currently available mobile phone holders that are not portable. Since this mobile phone holder is carried by the user, is visible and accessible to the user and has less complexity compared with the mobile phone holders in the prior art, this mobile phone holder is easy to be inspected by the user. In addition, since this mobile phone holder is portable and is normally attached to the mobile phone when the user carries the mobile phone, the user has it readily when the user uses a temporary car. This phone holder also provides a stand and a handle for the user to hold the phone. As a result of the mentioned characteristics, in this disclosure, a robust phone holder for mounting a mobile phone to the dashboard of a car is introduced which results in preventing sudden falling of the phone from the dashboard, reducing the risk of distraction and accidents. Additional advantages of this mobile phone holder are mentioned in the "Advantages" section and throughout this disclosure. Other advantages of one or more aspects will be apparent from the consideration of the drawings and ensuring description.

Advantages

Accordingly, several advantages of one or more aspects are as follows: to provide an apparatus for mounting a mobile phone to dashboard of a car whereby a closed loop is formed that goes around at least one air vent bar. Since the apparatus connects to the dashboard through a closed loop, it will be immune to the shakes and movements of the car and the mobile phone will not fall unless the user intentionally opens the loop and detaches the phone from the dashboard. Since the apparatus is not staying in the car, and hence it is not exposed to extreme temperature and sunshine for a long duration of time, its wear and tear is lower than the currently available and patented mobile phone holders. As an additional advantage, this apparatus provides a loop for holding the phone by hand. As an additional advantage, this apparatus provides a loop for holding the mobile phone by belt of the user. As an additional advantage, since this apparatus is attached, or integrated to the case of the mobile phone and is normally carried along with the mobile phone, the user will readily have it with himself/herself upon driving a new or temporary car such as a rental car. As an additional advantage, this apparatus provides a stand for placing the phone vertically or horizontally on a surface. This apparatus can also be used as a general-purpose fastener. Other advantages of one or more aspects will be apparent from a consideration of the drawings and ensuring description.

DRAWINGS—FIGURES

In the drawings, closely related figures have the same number but different alphabetic suffixes.

Figure 1:
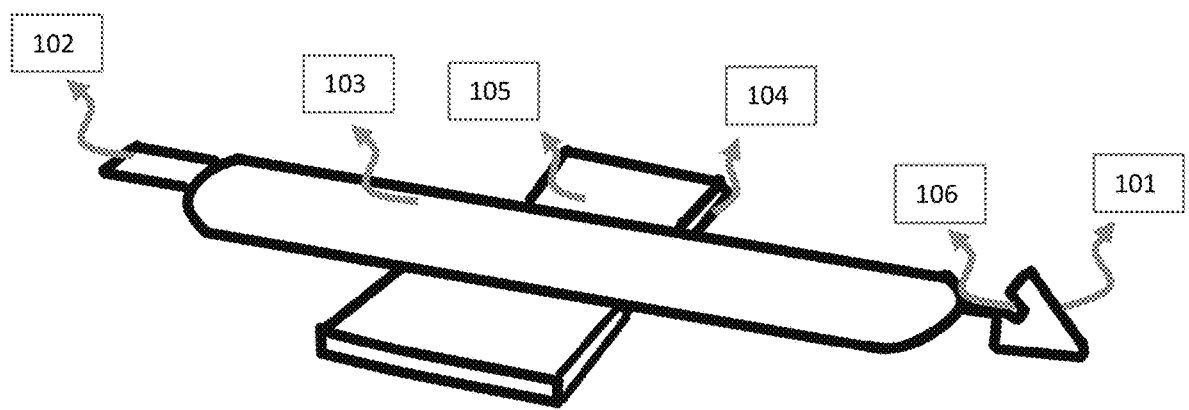
Figure 1:
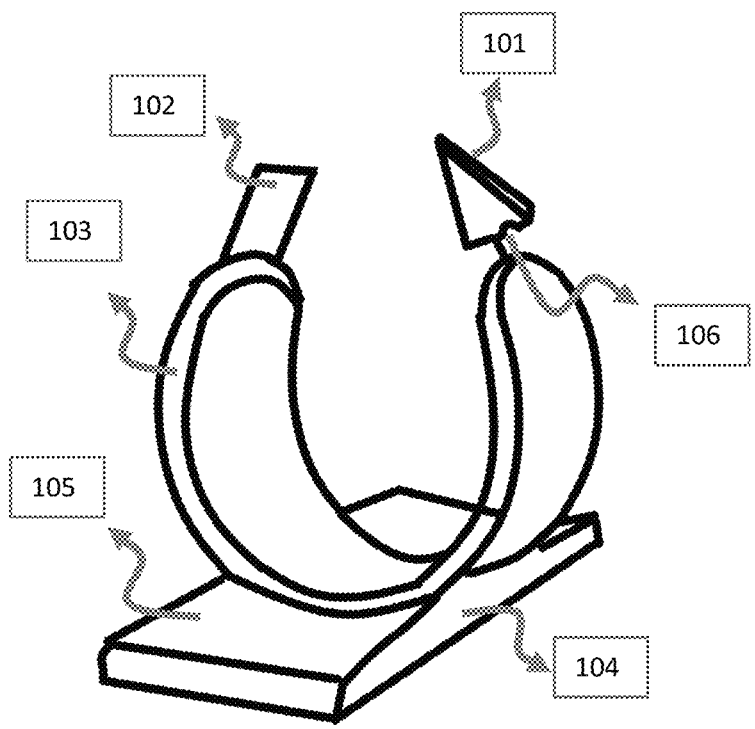
Figure 1:
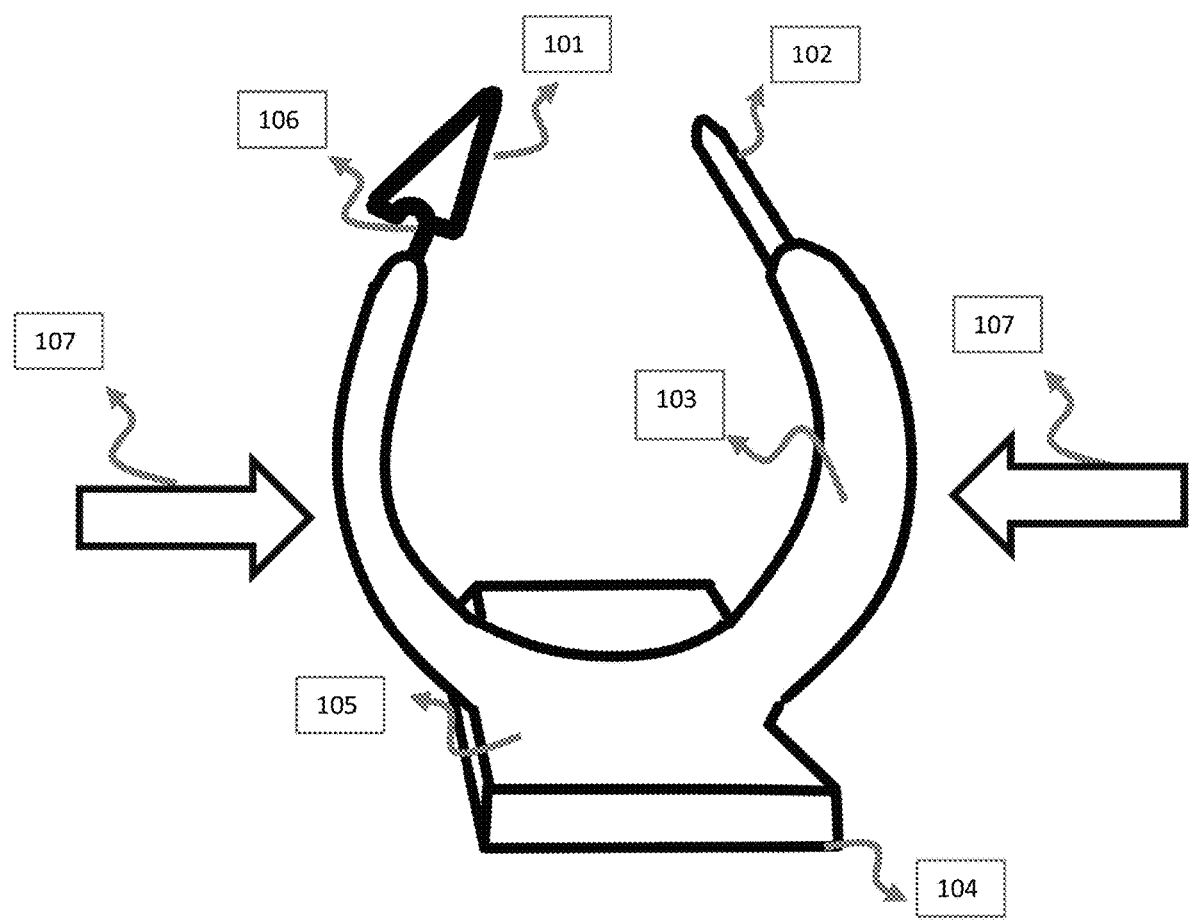
Figure 1:
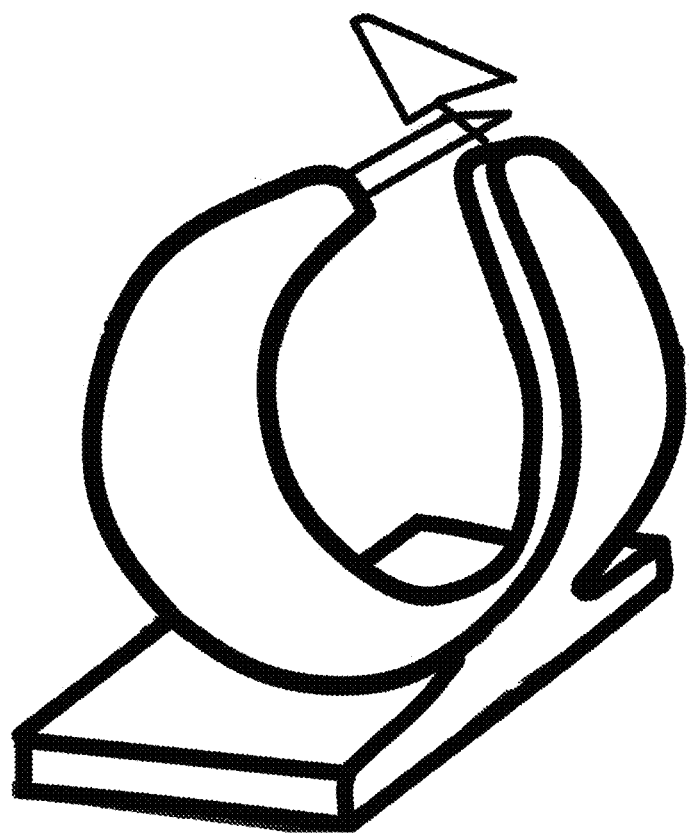
Figure 1:
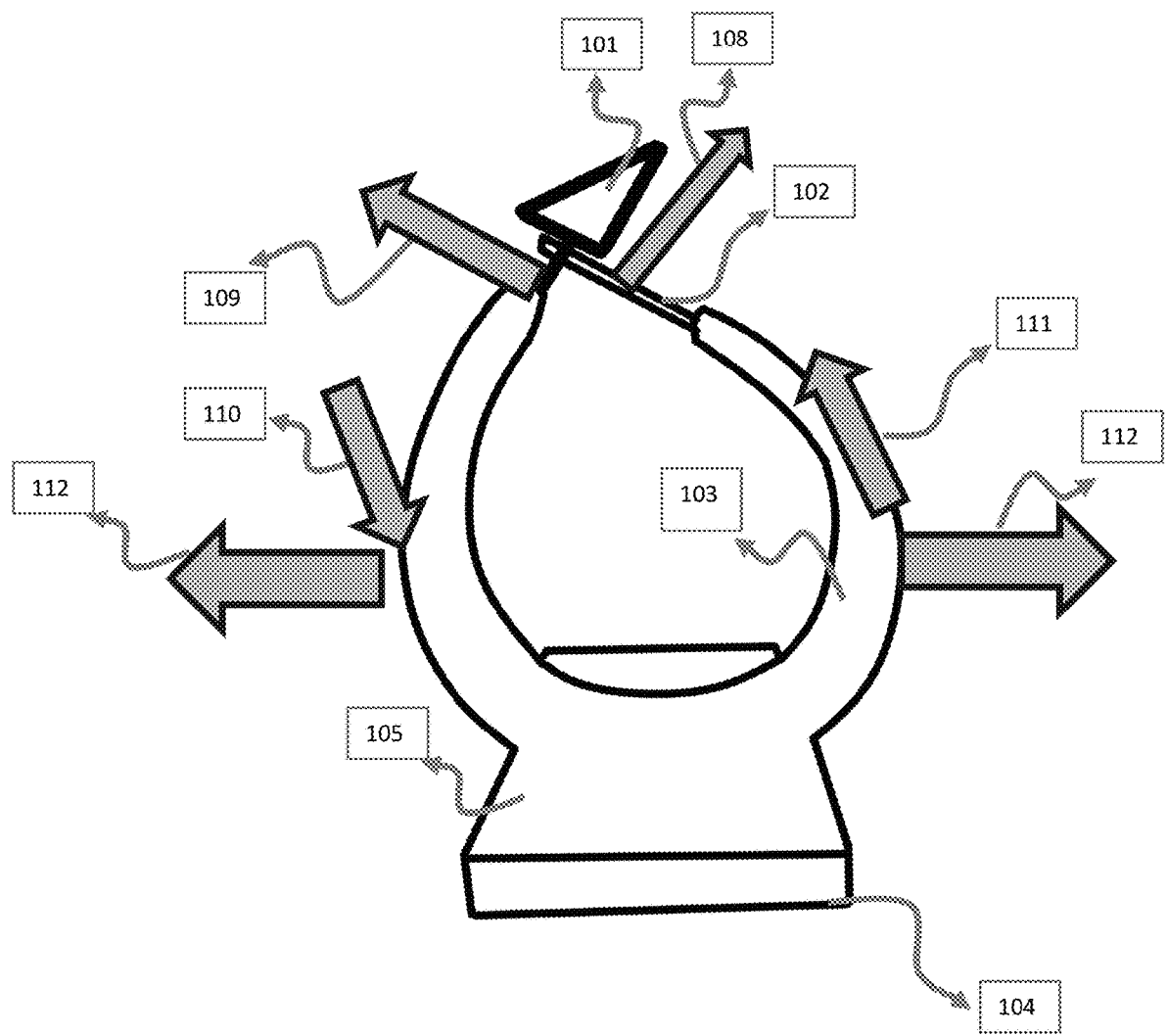

FIG. 1 A. Illustrates the disclosed apparatus in its open stable state.

FIG. 1 B. Illustrates, from a side angle, the disclosed apparatus in its half-closed stable state.

FIG. 1 C. Illustrates, from the front angle, the disclosed apparatus in its half-closed stable state.

FIG. 1 D. Illustrates, from a side angle, the disclosed apparatus in its locked stable state.

FIG. 1 E. Illustrates, from the front angle, the disclosed apparatus in its locked stable state.

Figure 2:
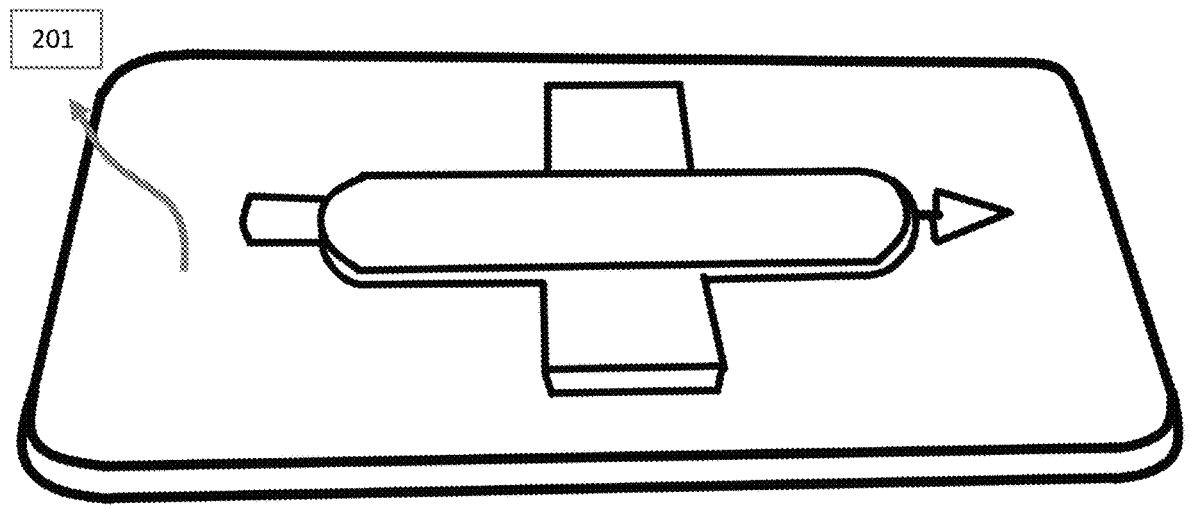
Figure 2:
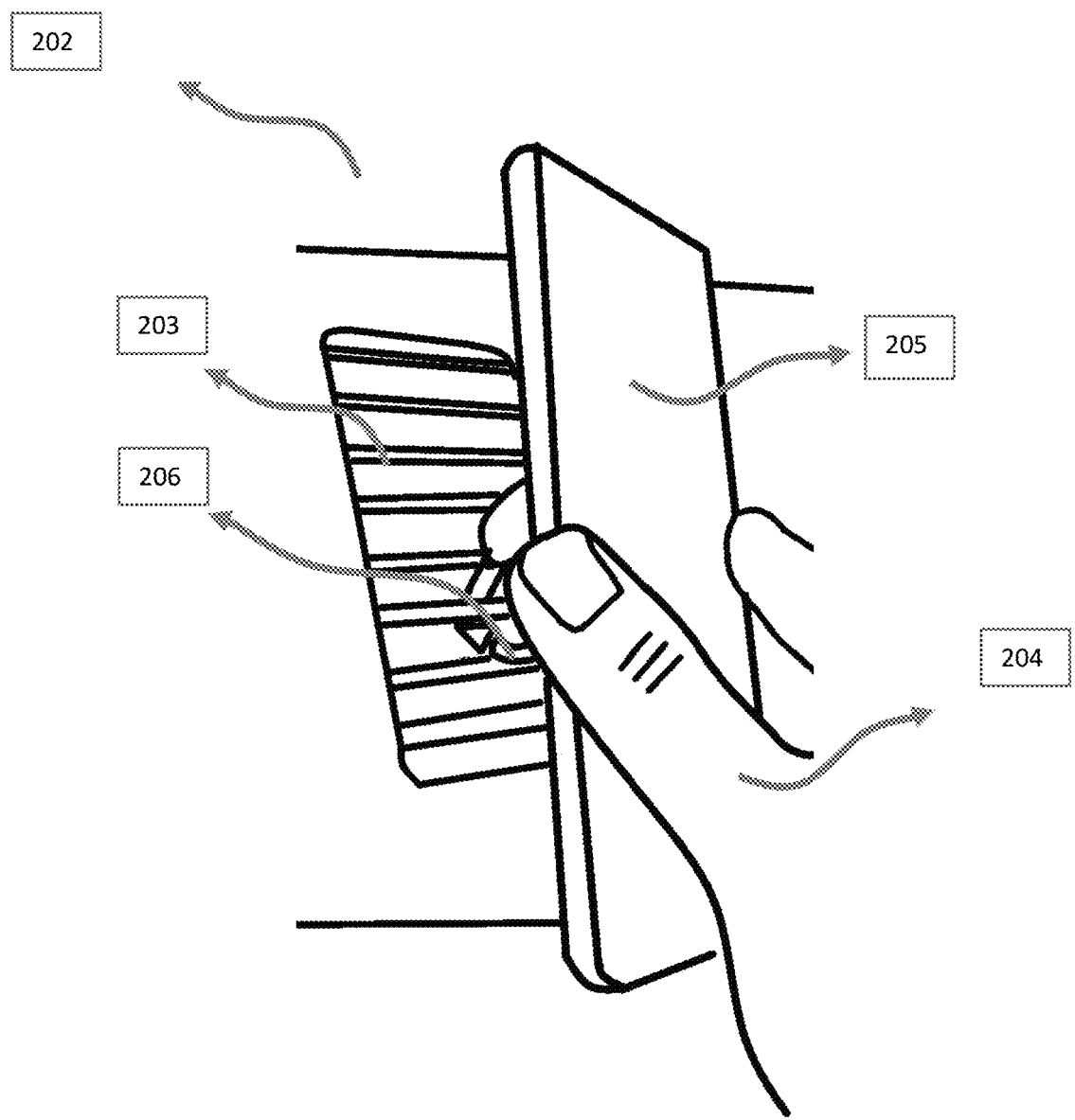
Figure 2:
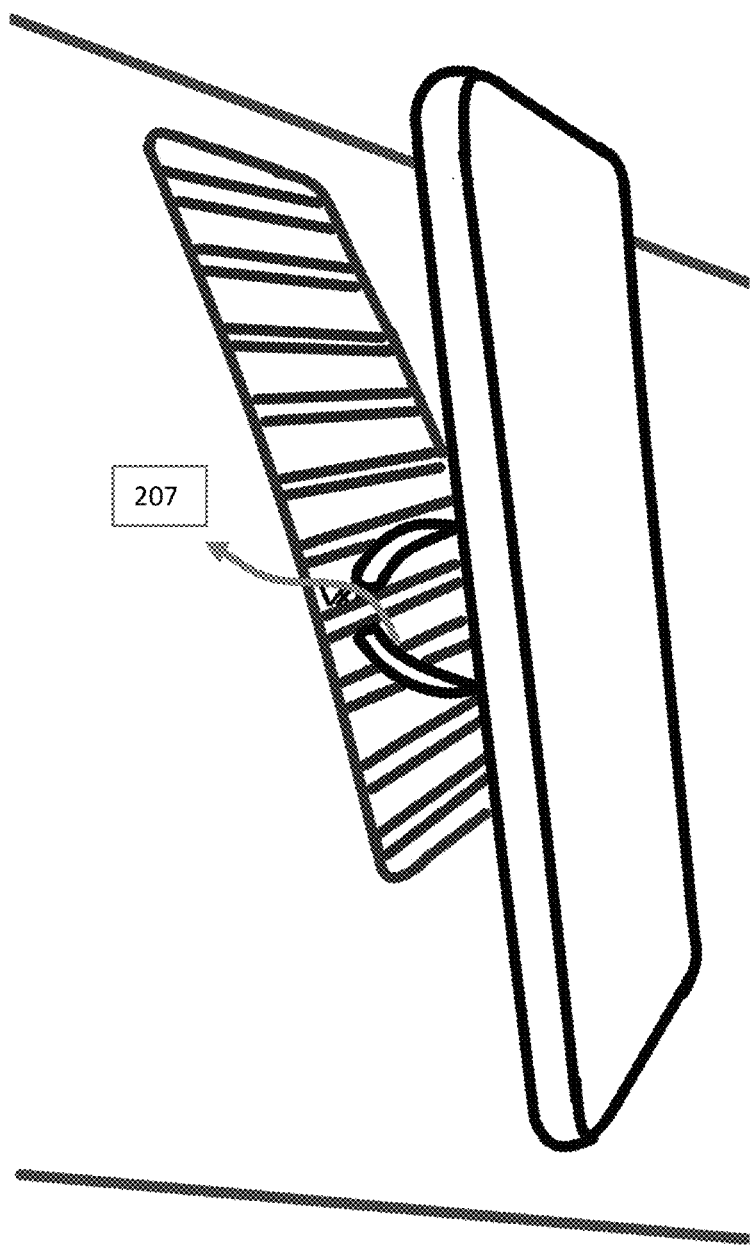
Figure 2:
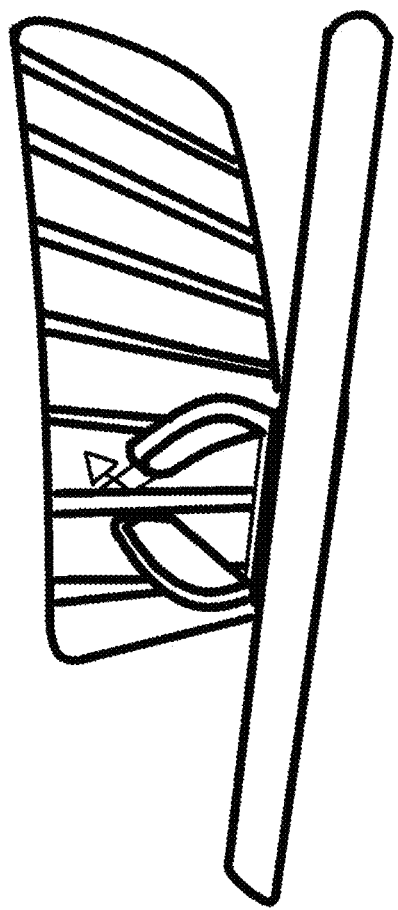
Figure 2:
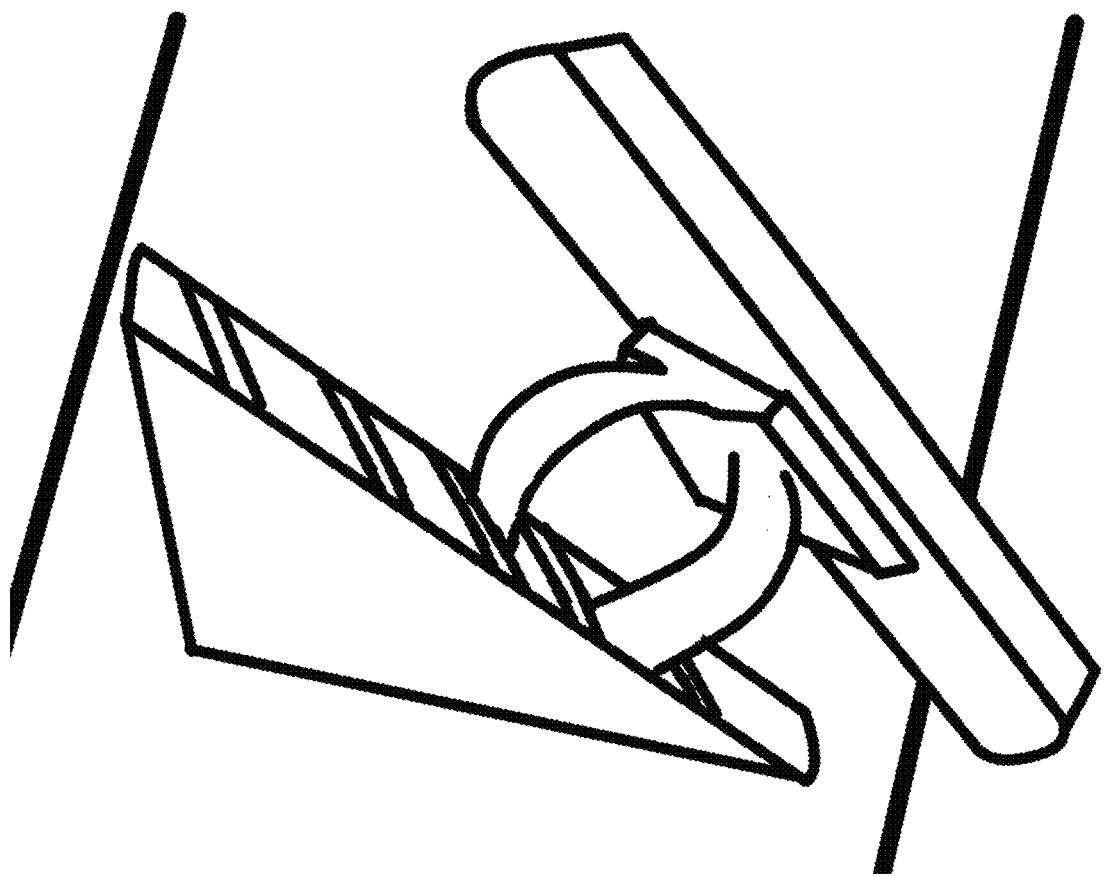

FIG. 2 A. Illustrates the apparatus of FIG. 1 A in its open stable state attached to the back of a mobile phone.

FIG. 2 B. Illustrates the apparatus of FIG. 2 A upon mounting a mobile phone to the dashboard of a car.

FIG. 2 C. Illustrates the apparatus of FIG. 2 A in its locked stable state providing a closed loop for mounting a mobile phone to at least one air vent bar on the dashboard of a car.

FIG. 2 D. Illustrates the apparatus of FIG. 2 A, from a side angle, in its locked stable state mounting a mobile phone to at least one air vent bar on the dashboard of a car.

FIG. 2 E. Illustrates the apparatus of FIG. 2 A, from the back angle, in its locked stable state mounting a mobile phone to dashboard of a car.

Figure 3:
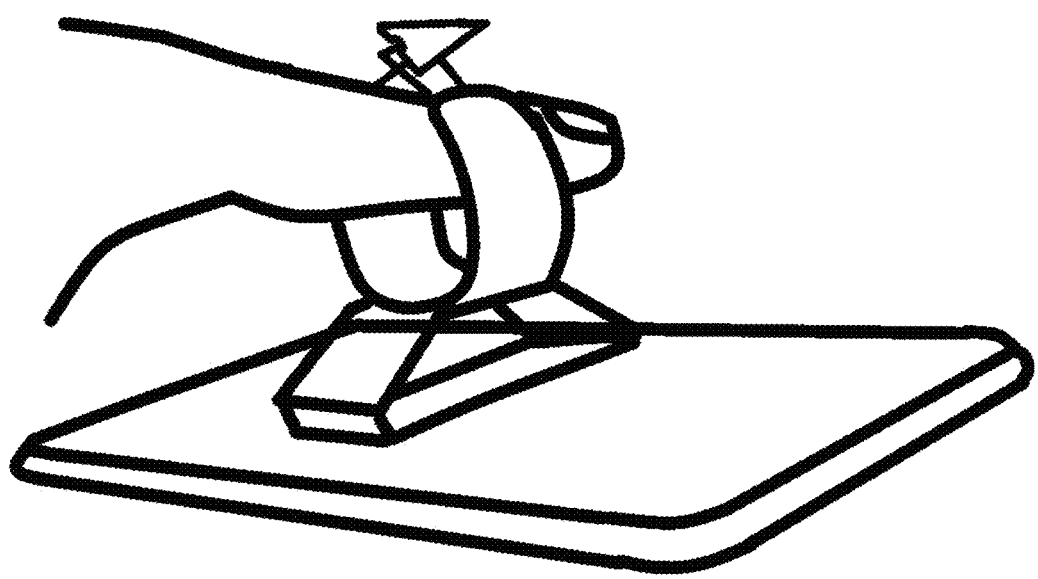

FIG. 3 Illustrates the apparatus of FIG. 2 A in its locked stable state mounting a mobile phone to a finger of a user.

Figure 4:
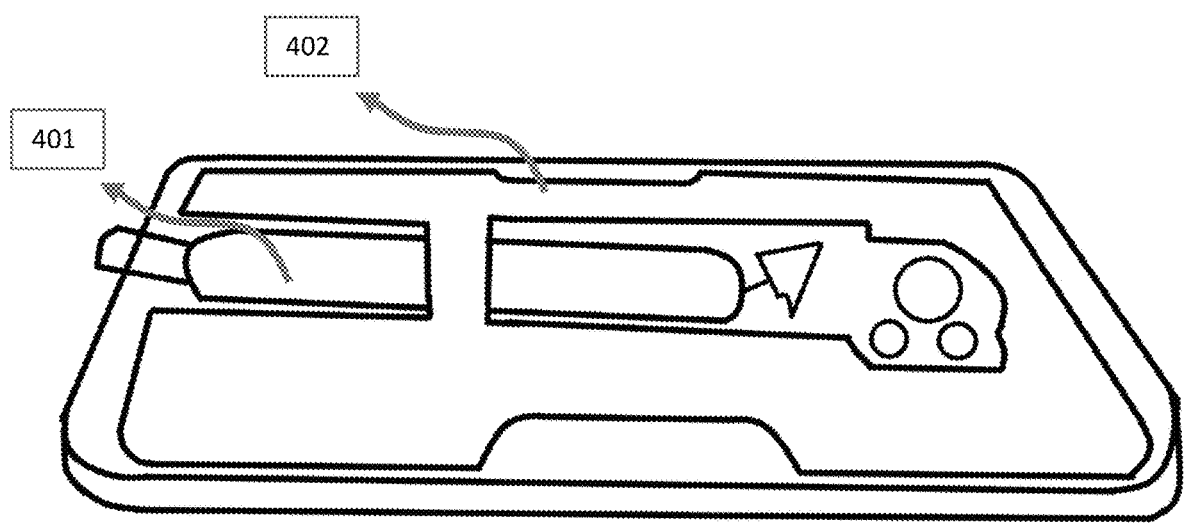
Figure 4:
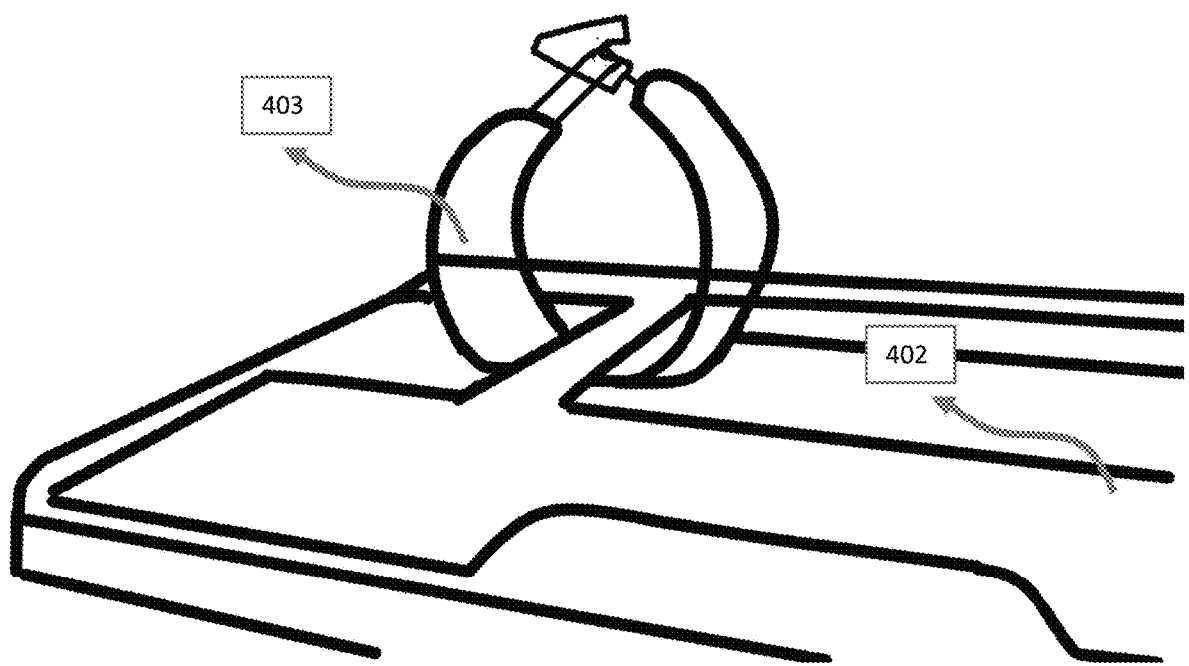
Figure 4:
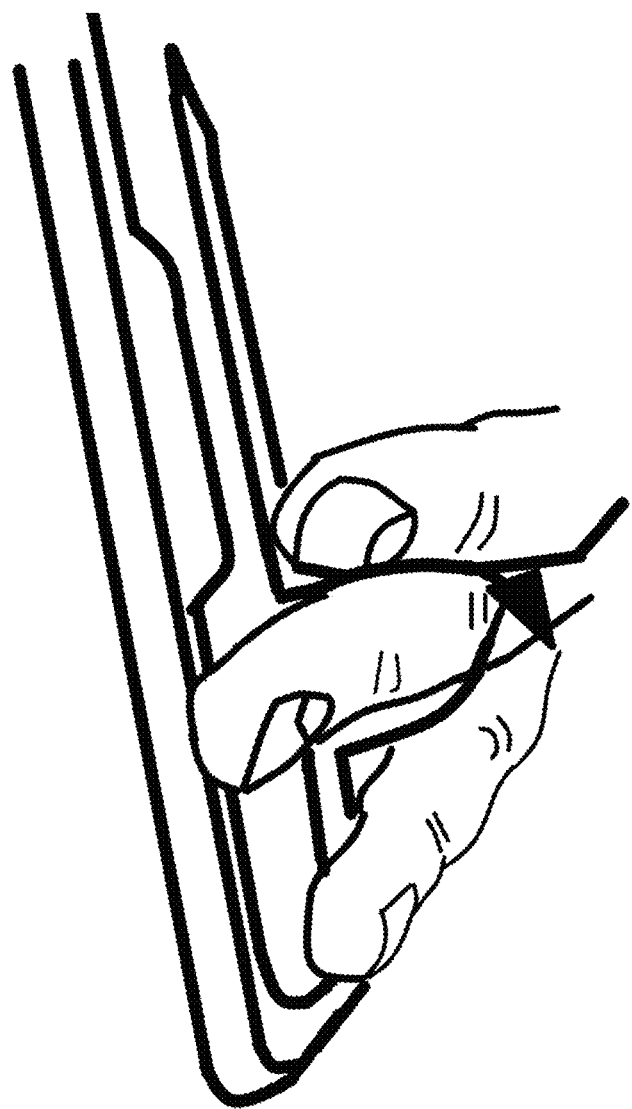

FIG. 4 A. Illustrates the apparatus of FIG. 1 A in its open stable state integrated into a case of a mobile phone.

FIG. 4 B. Illustrates the apparatus of FIG. 1 A, integrated to a case of a mobile phone, in its locked stable state.

FIG. 4 C. Illustrates the apparatus of FIG. 1 A in its locked stable state integrated into a case of a mobile phone, mounting the mobile phone to a finger of a user.

Figure 5:
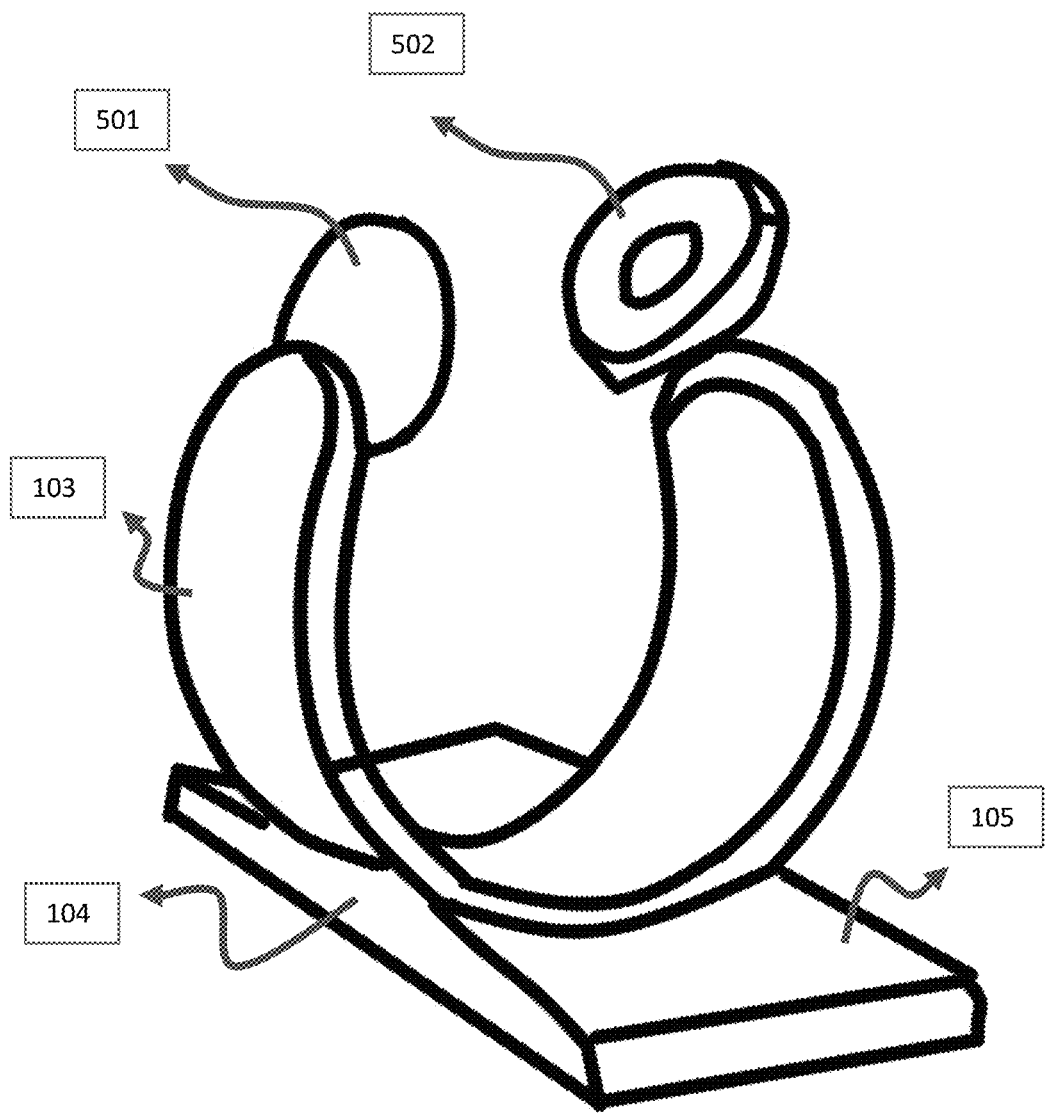
Figure 5:
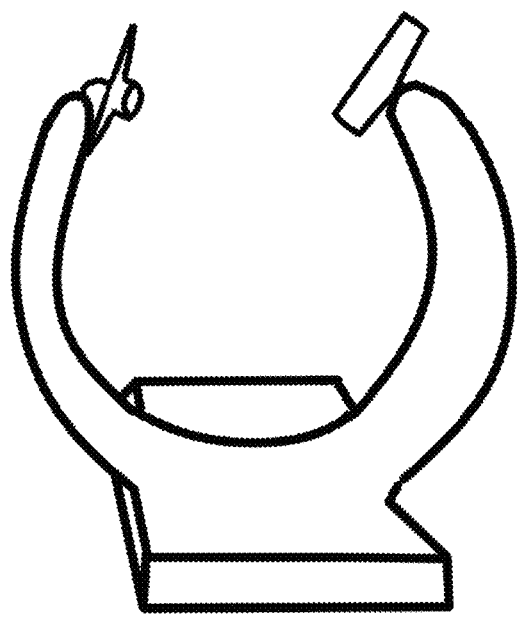
Figure 5:
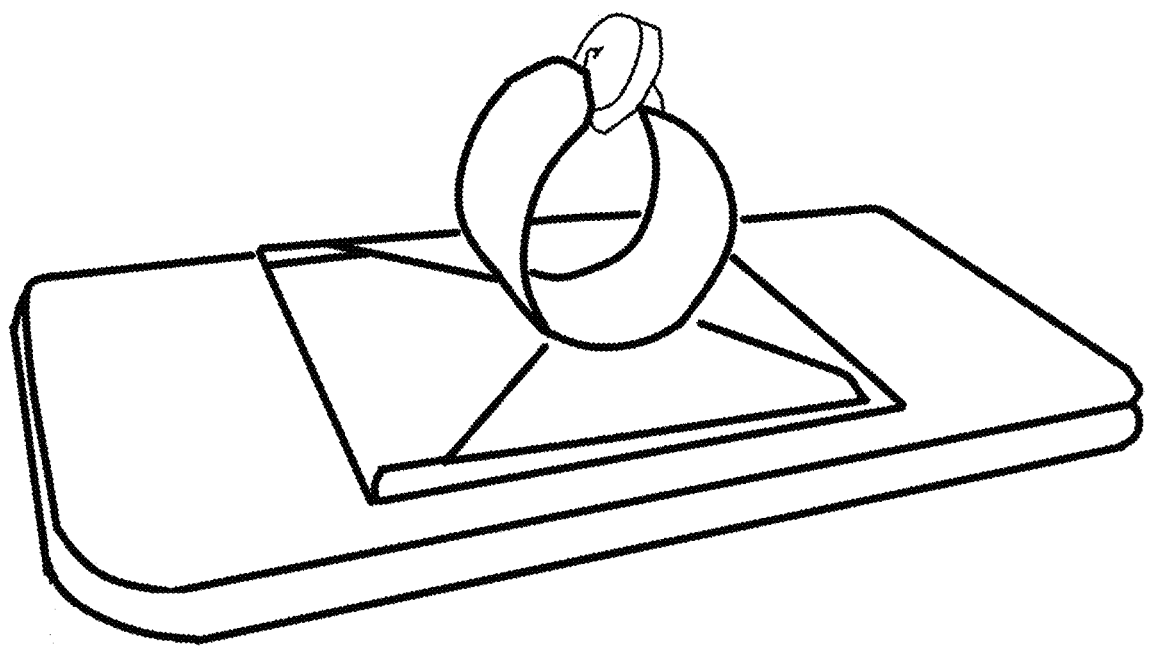
Figure 5:
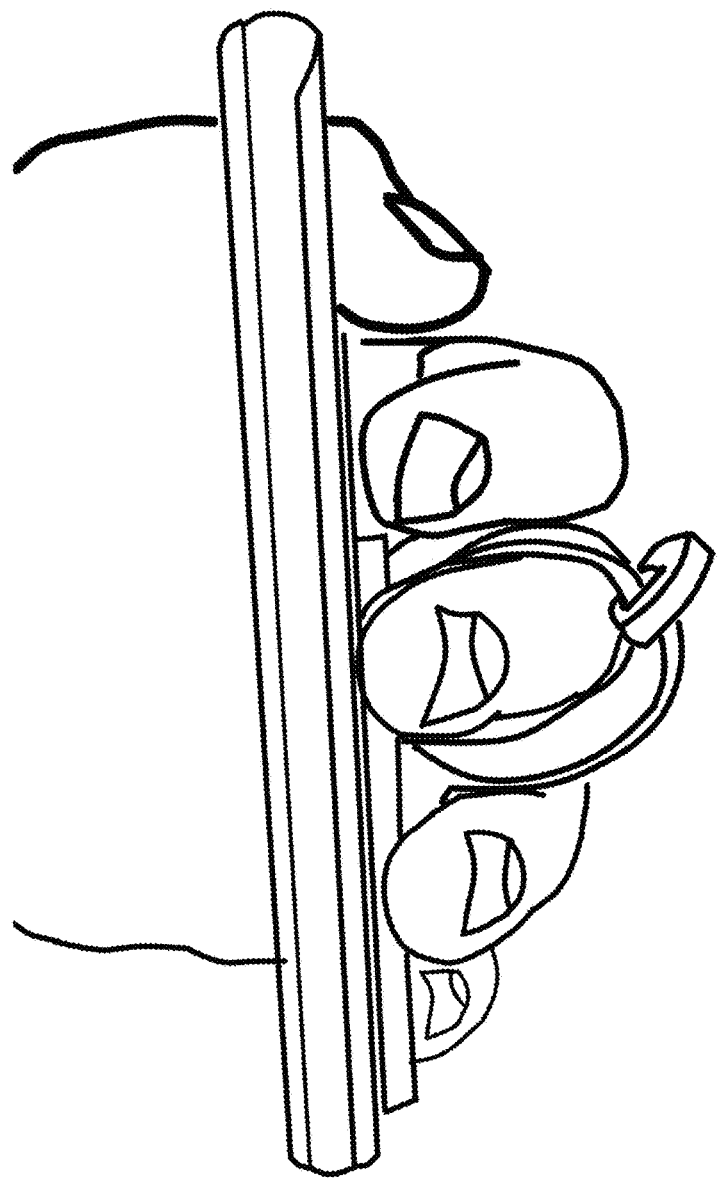
Figure 5:
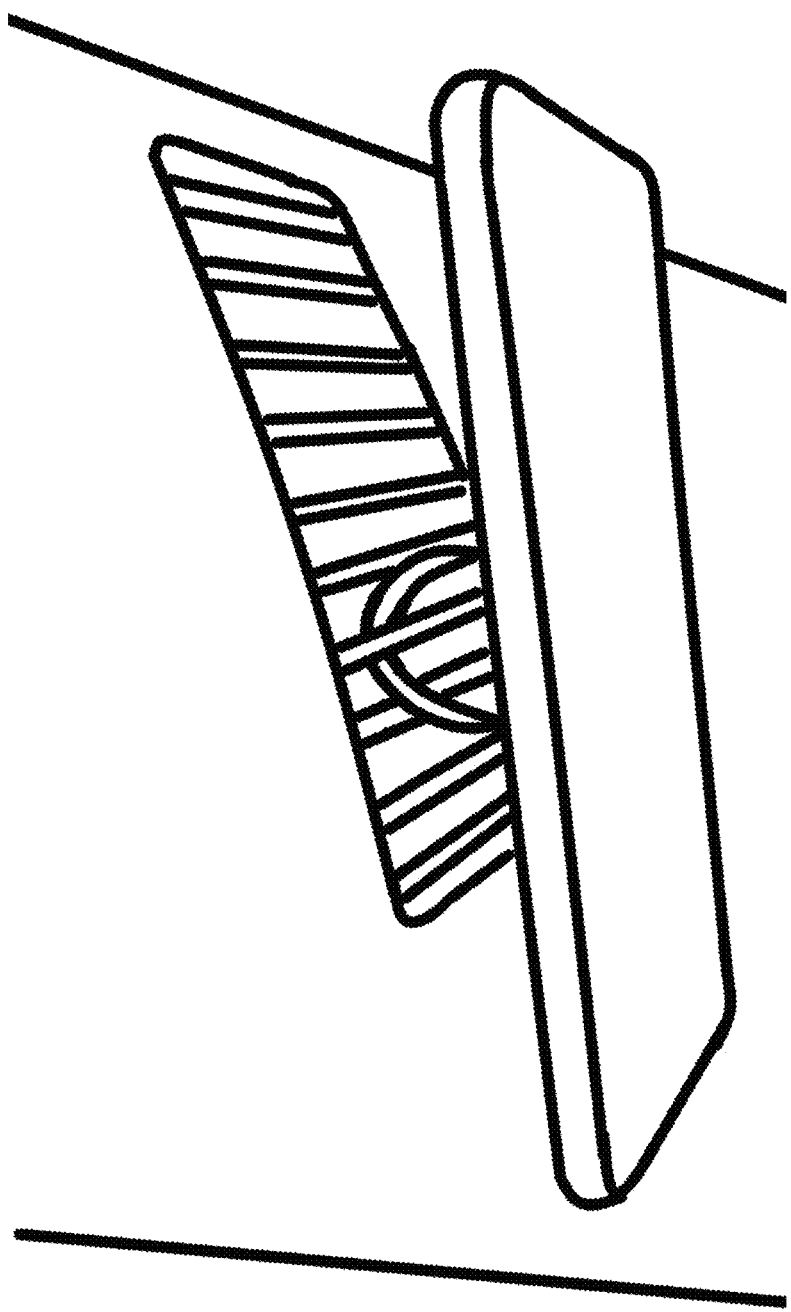
Figure 5:
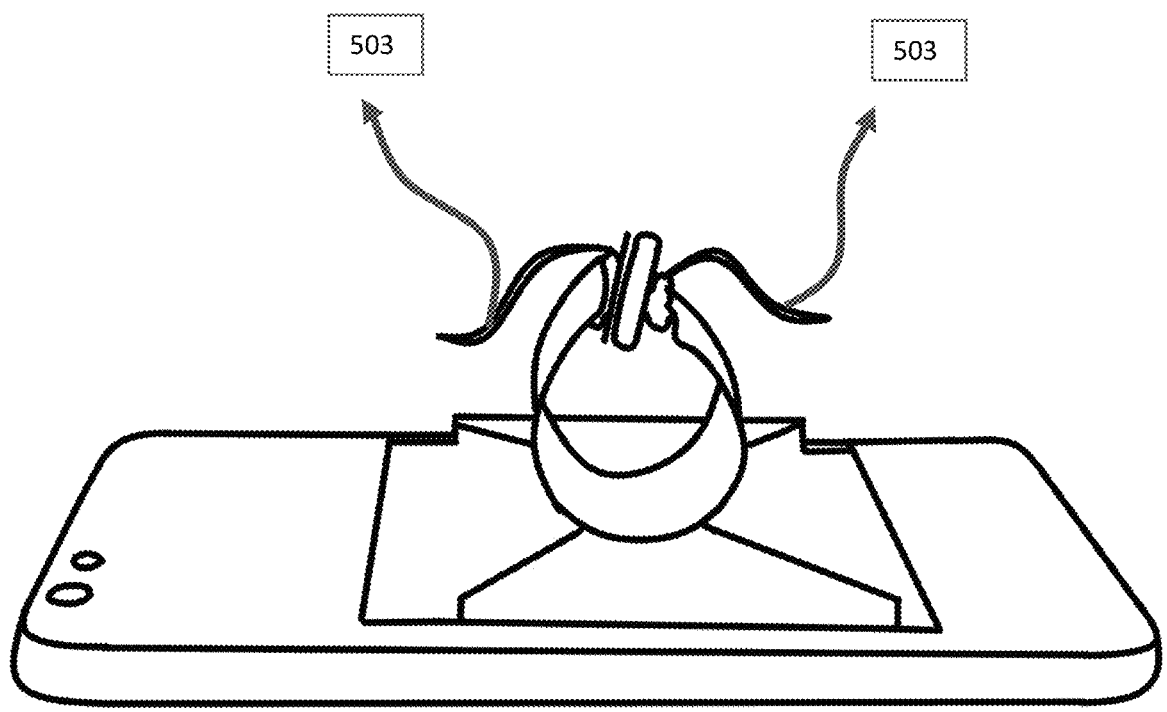
Figure 5:
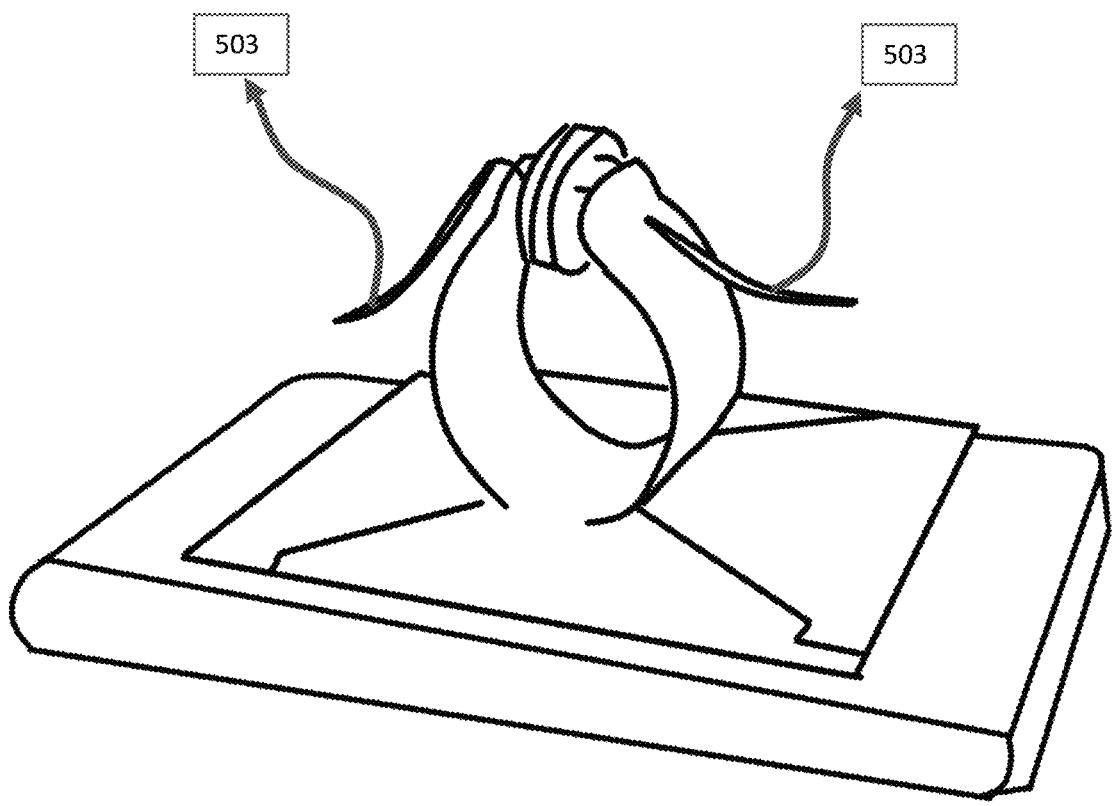
Figure 5:
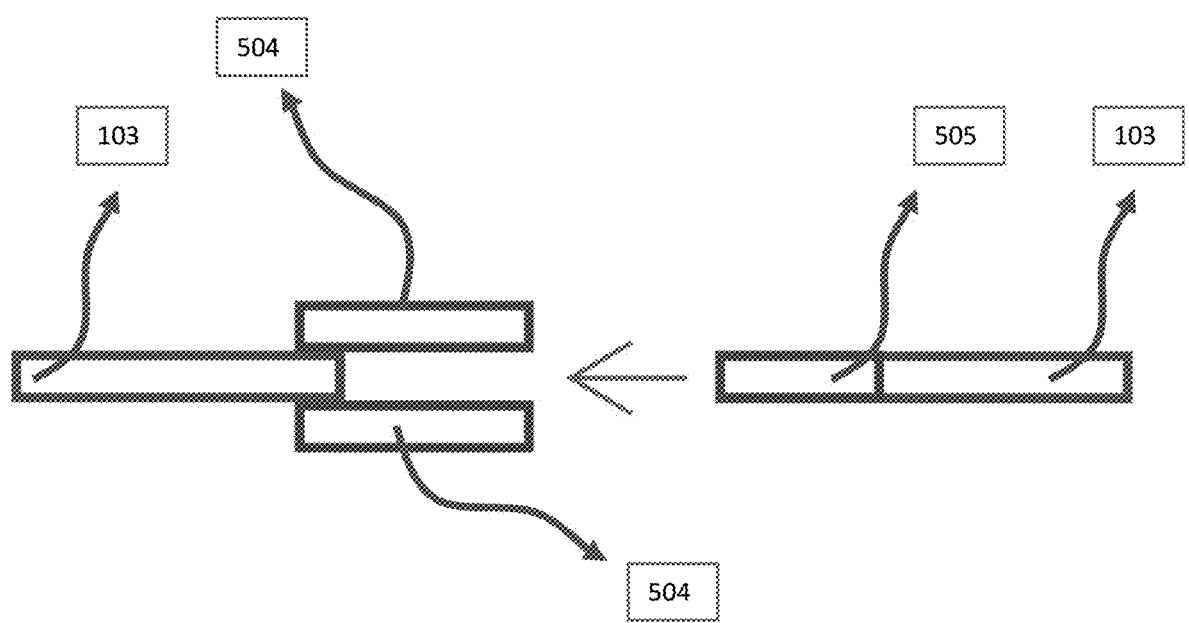
Figure 5:
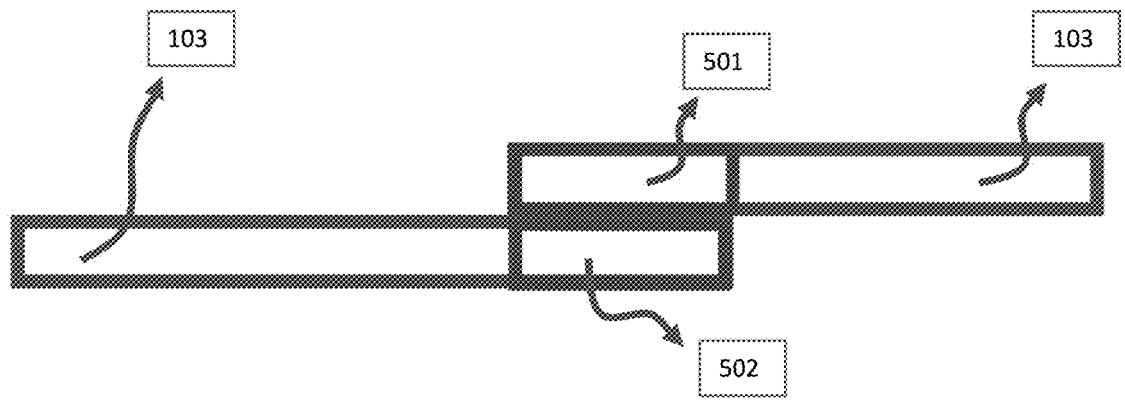
Figure 5:
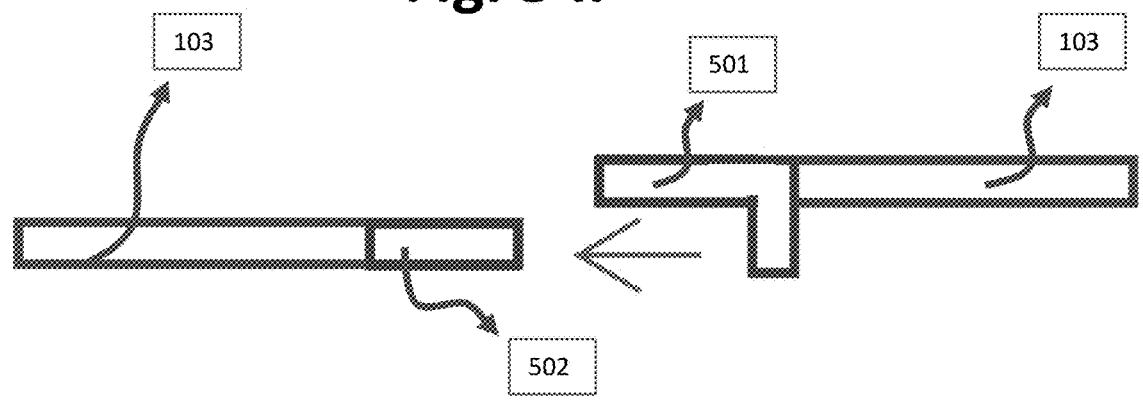
Figure 5:
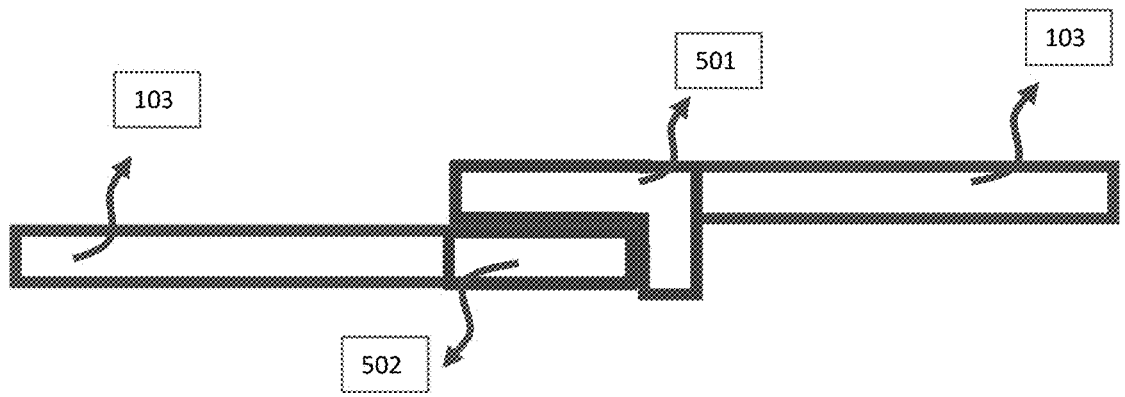

FIG. 5 A. Illustrates, from a side angle, the apparatus of FIG. 1 A. in its half-closed stable state wherein magnetic snap buttons, or magnets, are utilized for providing the locked stable state.

FIG. 5 B. Illustrates, from the front angle, the apparatus of FIG. 1 A. in its half-closed stable state wherein magnetic snap buttons, or magnets, are utilized for providing the locked stable state.

FIG. 5 C. Illustrates the apparatus of FIG. 5 A. in its locked stable state attached to the back of a mobile phone.

FIG. 5 D. Illustrates the apparatus of FIG. 5 C. looped around a finger of a user, providing the user with a loop to hold the mobile phone.

FIG. 5 E. Illustrates the apparatus of FIG. 5 C. in its locked stable state providing a closed loop for mounting a mobile phone to at least one air vent bar on the dashboard of a car.

FIG. 5 F. Illustrates the apparatus of FIG. 5 A. wherein two additional straps, or wires, are attached to the magnets providing the user means for opening the magnets easily.

FIG. 5 G. Illustrates the apparatus of FIG. 5 F. from a side angle.

FIG. 5 H. Illustrates the apparatus of FIG. 5 A. wherein a set of two magnetic plates is integrated on one end arm of the bistable spring and a metallic piece that gets locked between the magnetic plates is integrated on the other end arm of the bistable spring.

FIG. 5 I. Illustrates the apparatus of FIG. 5 A. wherein 501 and 502 are positioned on the bistable spring in the way that their surfaces that are in parallel to the bistable spring get attached to one another.

FIG. 5 J. Illustrates the apparatus of FIG. 5 I. wherein 501 and 502 are designed to get attached to one another on two sides for providing higher amount of magnetic force.

FIG. 5 K. Illustrates the apparatus of FIG. 5 I. wherein 501 and 502 are designed to get attached to one another on two sides for providing higher amount of magnetic force.

Figure 6:
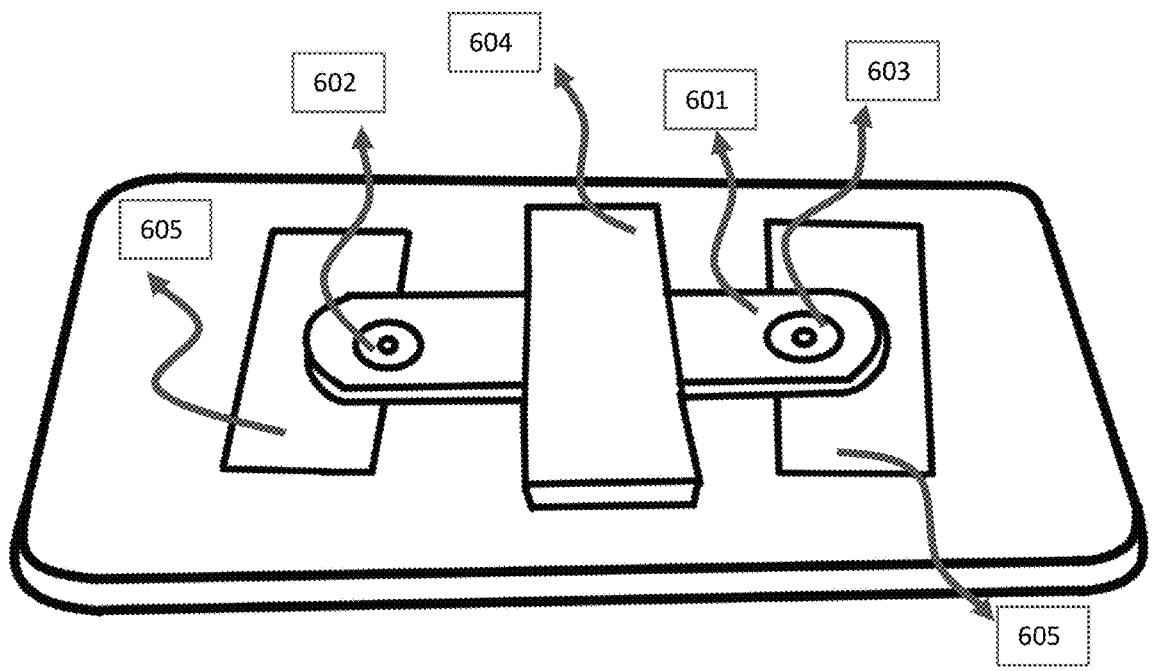
Figure 6:
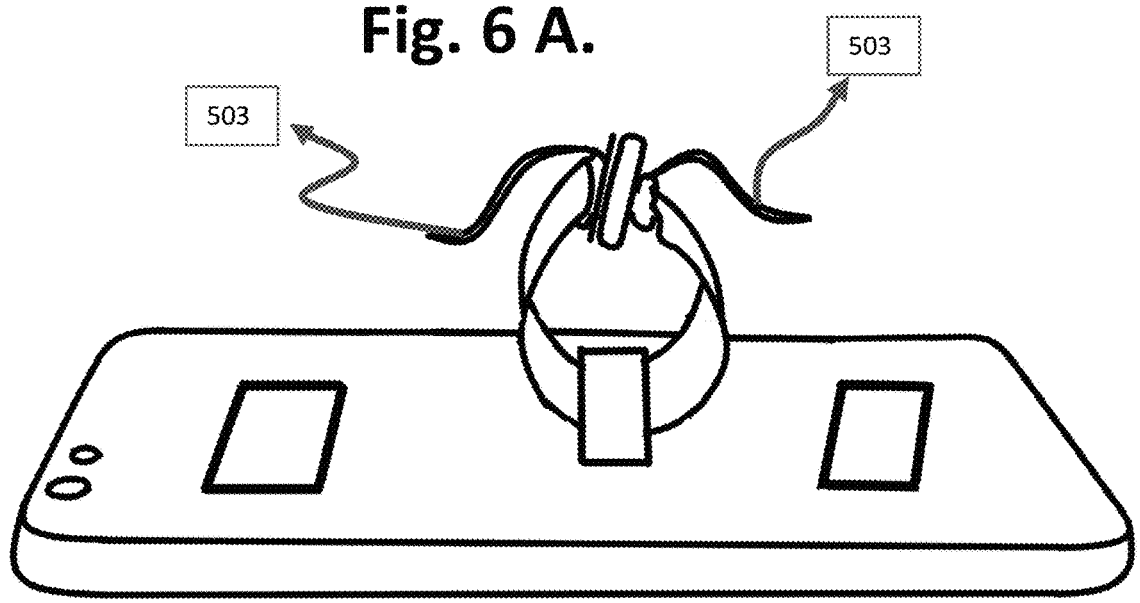
Figure 6:
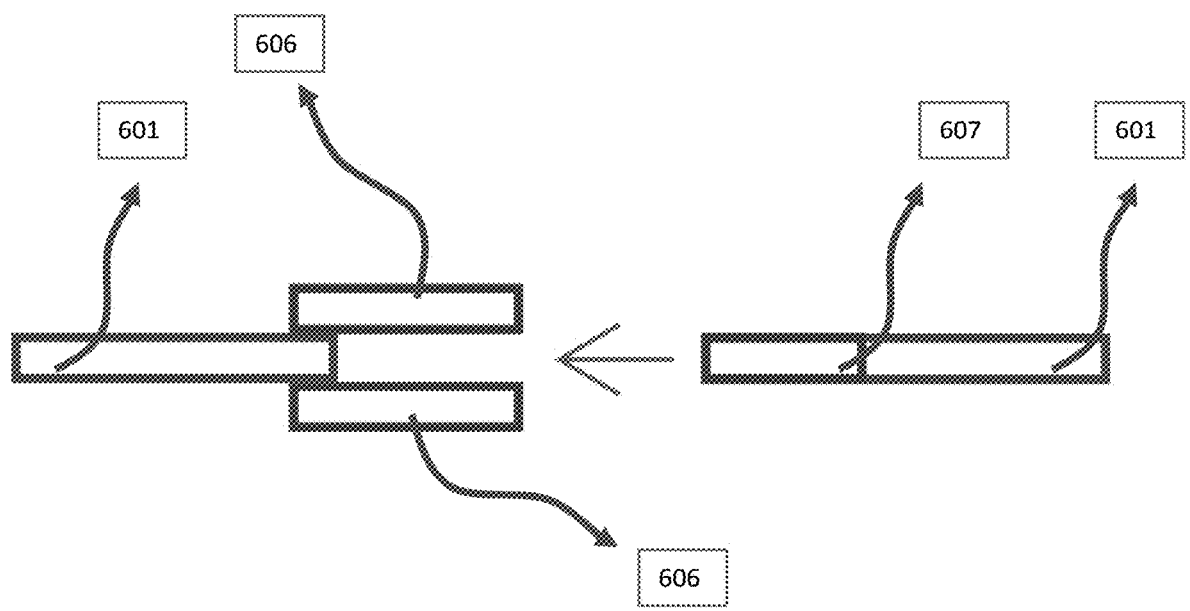

FIG. 6 A. Illustrates the apparatus of FIG. 5 A. wherein a strap is used instead of the bistable spring.

FIG. 6 B. Illustrates the apparatus of FIG. 6 A. in its closed state.

FIG. 6 C. Illustrates the apparatus of FIG. 6 A. wherein a set of two magnetic plates is integrated on one end arm of the strap and a metallic piece that gets locked between the magnetic plates is integrated on the other end arm of the strap.

FIG. 6 D. Illustrates the apparatus of FIG. 6 A. wherein 602 and 603 are positioned on the strap in the way that their surfaces that are in parallel to the strap get attached to one another.

Figure 7:
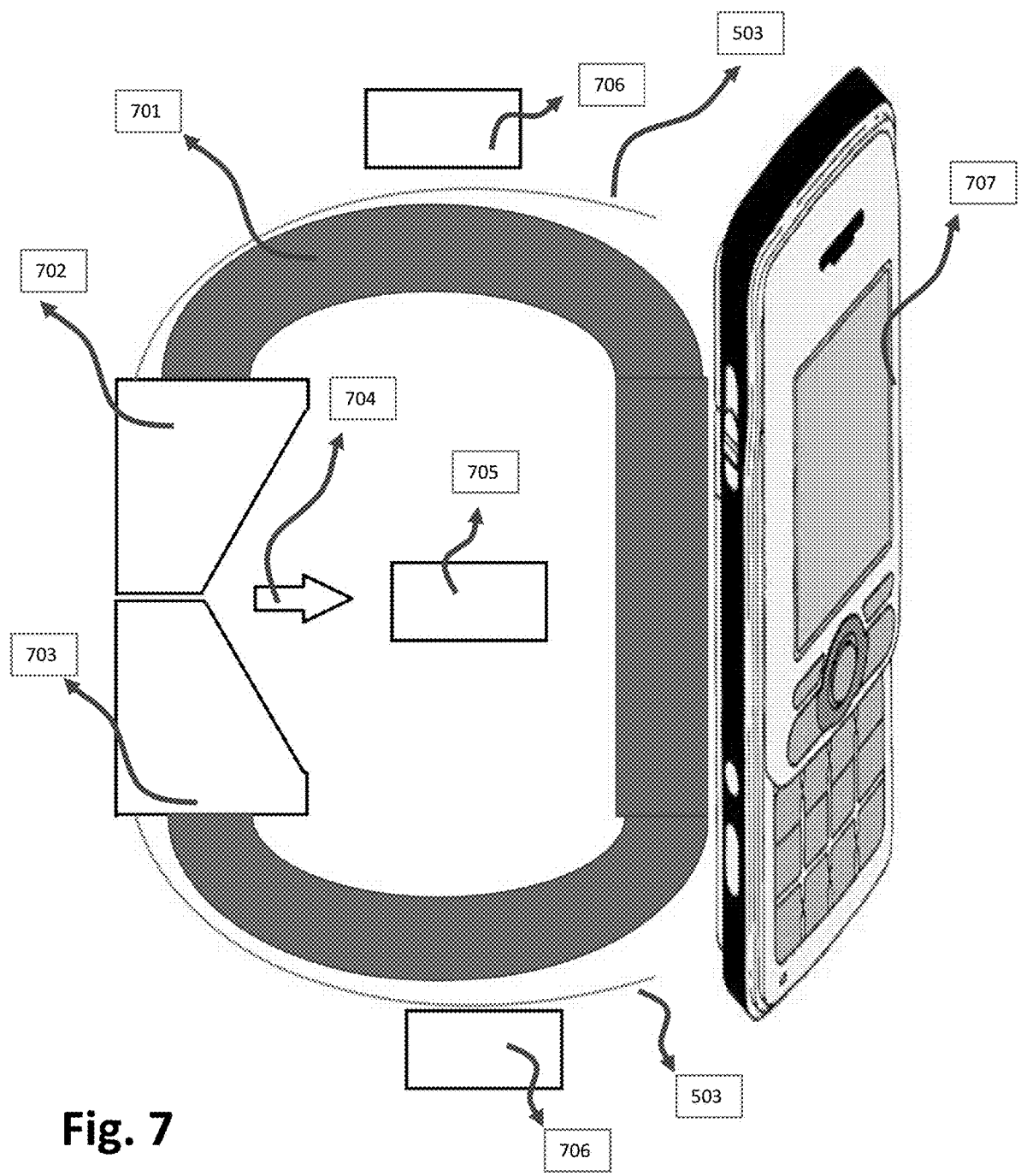

FIG. 7 Illustrates the apparatus of FIG. 6 A. or FIG. 5 A. wherein the sides of the magnets that face the air vent bar are manufactured tilted, providing the user means for detaching the mobile phone easily by pulling the mobile phone toward the air vent bar.

FIG. 8 A. Illustrates the apparatus of FIG. 1 A. wherein 101 and 102 are not used, instead, the friction force between the two arms of 103 that are sandwiched between two sets of air vent bars keeps the bistable spring in a closed loop shape.

FIG. 8 B. Illustrates the apparatus of FIG. 8 A. mounting a mobile phone to an air vent on the dashboard of a car.

FIG. 9 A. Illustrates the apparatus of FIG. 1 A., or FIG. 6 A., wherein instead of 101 and 102, or 602 and 603, brass fasteners are used for attaching said bistable spring, or said strap, to the air vent bars.

FIG. 9 B. Illustrates the apparatus of FIG. 1 A., or FIG. 6 A., wherein instead of 101 and 102, or 602 and 603, brass fasteners are used for attaching said bistable spring, or said strap, to the air vent bars.

FIG. 9 C. Illustrates the apparatus of FIG. 1 A., or FIG. 6 A., wherein instead of 101 and 102, or 602 and 603, tabs are used for attaching said bistable spring, or said strap, to the air vent bars.

FIG. 9 D. Illustrates the apparatus of FIG. 1 A., or FIG. 6 A., wherein instead of 101 and 102, or 602 and 603, a set of two parallel surfaces, or two rings that are positioned in parallel to each other, are used to grip air vent bars.

FIG. 9 E. Illustrates the apparatus of FIG. 9 D., wherein only one pair of parallel surfaces, or rings, is used.

Figure 10:
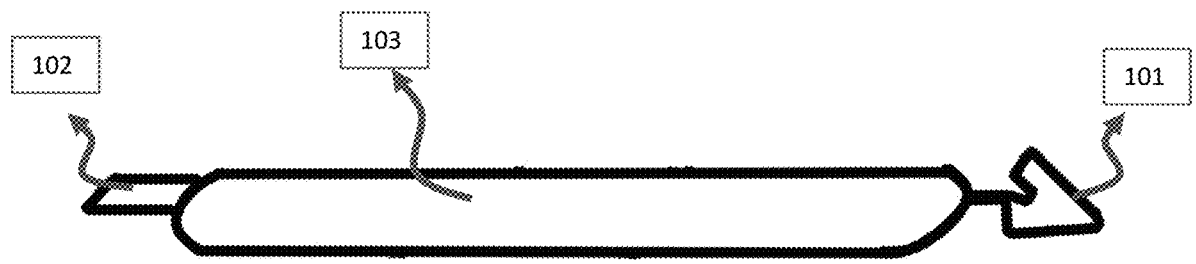
Figure 10:
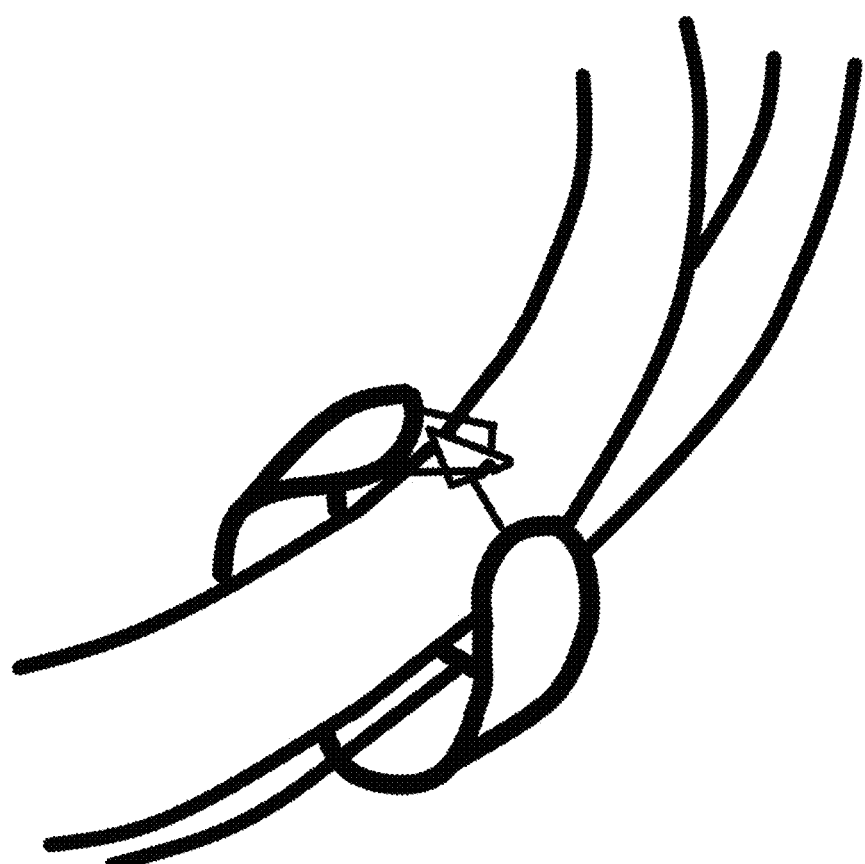
Figure 10:
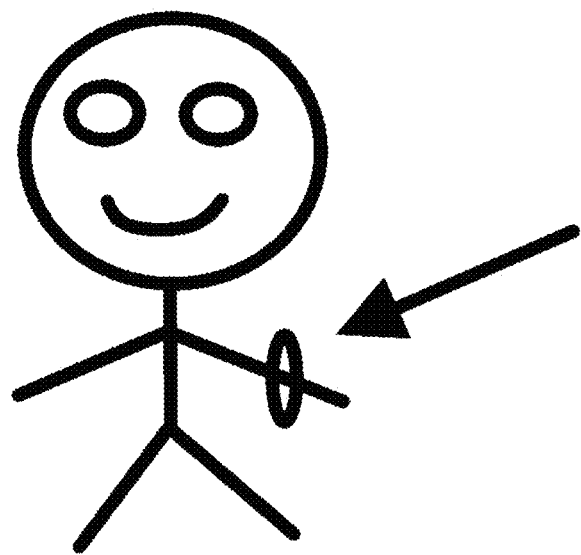
Figure 10:
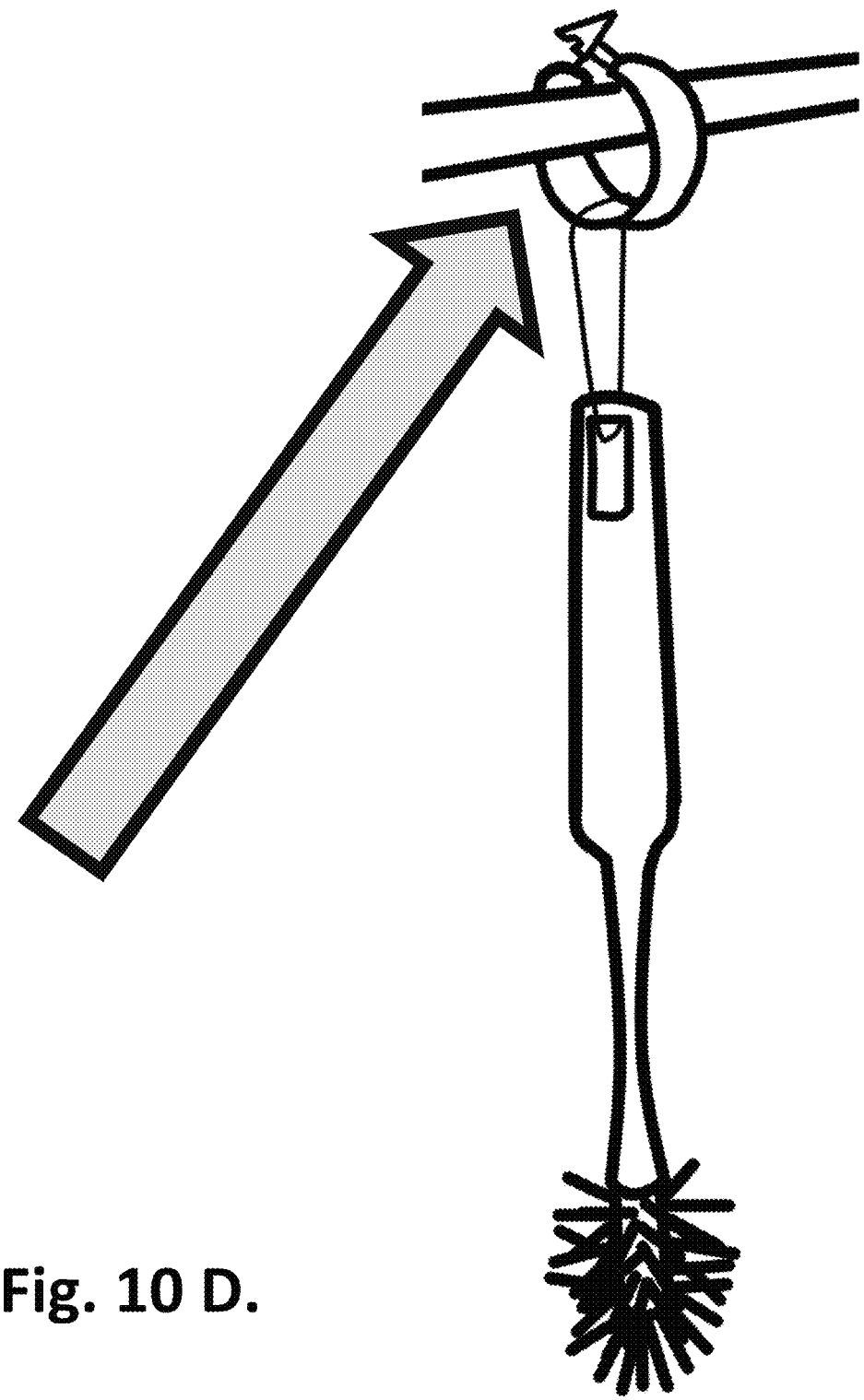
Figure 10:
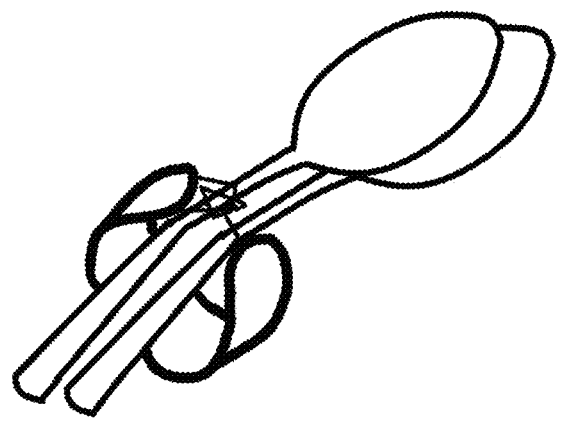

FIG. 10 A. Illustrates the apparatus of FIG. 1 A. wherein 104 and 105 are omitted so that the apparatus can be used as a multi-purpose fastener.

FIG. 10 B. Illustrates the apparatus of FIG. 10 A. fastening two objects to each other.

FIG. 10 C. Illustrates the apparatus of FIG. 10 A. used as a bracelet or a toy.

FIG. 10 D. Illustrates the apparatus of FIG. 10 A. used for hanging an object from a bar.

FIG. 10 E. Illustrates the apparatus of FIG. 10 A. fastening objects to each other.

DRAWINGS—REFERENCE NUMERALS

101 Fastening device
102 A frame with at least one hollow opening, or at least one hole, for trapping 101
103 Main body made of bistable spring
104 Base with adhesive back for attaching the apparatus to the phone case
105 Foundation for attaching 103 to 104
106 A dip in the fastening device for trapping 102
107 Direction of the forces that a user applies for closing the loop (trapping 101 into 102)
108 Direction of the force that 102 is applying to 101
109 Direction of the force that 101 is applying to 102
110 Direction of the force that is applied by the user for unlocking the apparatus through untrapping 101 from 102
111 Direction of the force that is applied by the user together with 110 for unlocking the apparatus through untrapping 101 from 102
112 Direction of the force that is applied by the user for opening the apparatus after 110 and 111 are applied and after 101 and 102 are unlocked from each other
201 Back of a mobile phone
202 Dashboard of a car
203 Air vent bars on the dashboard of a car
204 Hand of a user
205 A mobile phone
206 The apparatus of FIG. 1 A. in its half open stable state
207 The apparatus of FIG. 1 A. in its locked stable state, mounting a mobile phone to an air vent bar
401 The apparatus of FIG. 1 A. in its open stable state incorporated into a case of a mobile phone
402 Back of a mobile phone
403 The apparatus of FIG. 1 A. in its locked stable state incorporated into a case of a mobile phone
501 One part of magnetic snap buttons, or magnets
502 One part of magnetic snap buttons, or magnets
503 A pair of wires or straps attached to the back of the magnetic snap buttons, or magnets, providing the user with means to open easily the magnetic snap buttons, or magnets
504 Magnetic plates that are integrated on one end arm of the bistable spring
505 Metallic piece that is integrated on one end arm of the bistable spring to get attached in 504

601 A strap which can be made in one piece or be formed by several pieces of straps connected through patches
602 One part of magnetic snap buttons, or magnets
603 One part of magnetic snap buttons, or magnets
604 Device for attaching 601 to back of the mobile phone providing 601 the flexibility of creating a closed loop as well as an open state
605 Devices for attaching the arms of 601 to back surface of the mobile phone, providing means for keeping 601 straight and securely attached to the back of the mobile phone when the strap is not creating a closed loop
606 Magnetic plates that are integrated on one end arm of the strap
607 Metallic peace that is integrated on one end arm of the strap to get attached in 606
701 The main body of the mobile phone holder (said strap, 601, or said bistable spring, 103)
702 A piece of magnet or one piece of magnetic snap buttons
703 A piece of magnet or one piece of magnetic snap buttons
704 Direction of the force that the user applies for detaching the mobile phone holder from the air vent
705 An Air vent bar that the mobile phone holder creates a closed loop around
706 Adjacent air vent bars
707 A mobile phone
901 Brass fasteners, or money clips
902 Air vent bars thereon the brass fasteners, or money clips, attach 701
903 Taps for attaching the strap, or bistable spring, to air vent bars
904 Two parallel plates, or two rings that are positioned in parallel to each other, so that one air vent bar can be placed in between them for attaching the strap, or bistable spring, to air vent bars

DETAILED DESCRIPTION OF THE INVENTION

FIG. 1 A illustrates the disclosed mobile phone holder in its open shape. 103 is a bistable spring which is coated with elastic material, such as rubber. The coating of the bistable spring is proposed to avoid scratching the objects that come to connection to the bistable spring and also for enhancing the user experience in case said bistable spring is made of metal. In case the bistable spring is made of plastic, the coating might be omitted. In addition, this coating increases the friction between the arms of said bistable spring and air vent bars, providing better attachment of the mobile phone to the air vents. For making a closed loop, first, the user triggers the bistable spring, 103, by either pulling up the two arms of it or pushing approximately the middle of it. As a result, 103 transits to its half-closed stable shape, as illustrated in FIG. 1 B, then the user pushes the two arms of 103 toward each other by applying the forces illustrated by 107, illustrated in FIG. 1 C. As a result of the force applied by the user, 101 enters into 102 and gets locked. The direction of the forces that 101 and 102 apply to each other are illustrated by 108 and 109. These forces keep the bistable spring in its closed loop state. As a result, a third stable state of the apparatus forms, which in this disclosure is called locked stable state, as illustrated in FIG. 1 D.

102 and 101 can be coated or can be formed with the same coating rubber that coats the bistable spring. They can also be made together with bistable spring in one piece.

When the user is using the apparatus for mounting a mobile phone to an air on the dashboard of a car, 101 and 102 will be located inside the air vent. Hence, the user will not be able to visually see 101 and 102 very well. In addition, since the two end arms of 103 will be inside the air vent, the user cannot apply and transfer much force to the two end arms of 103. As a result, regular snaps or buttons cannot be used instead of 101 and 102. In other words, the user cannot fasten regular snaps or buttons while they are located behind the air vent bars and thus such buttons cannot be used for 101 and 102. 102 is designed to be a hollow frame and 101 is designed to go inside 102 without the need for applying significant force. The user will not need much control to match the location of 101 into 102, and the user will not need much control to trap 101 into 102. By pushing the two arms of 103, 101 will automatically be guided to 102 and gets trapped, and the locked loop will form. The apparatus keeps this locked mode until the user pushes the arms of 103 toward each other and unstraps 101 and 102 from each other by applying forces 110 111, and 112 which will be resulted in bringing back 103 to its half-closed stable mode.

For attaching the apparatus to the back of a mobile phone, 104 which carries an adhesive surface on its bottom, is attached to 103 through 105. The use of 105 is proposed because if 103 is directly attached to 104, the weight of the phone that is hanged through 103 and the pulling of 103 through the weight of the phone, will cause the adhesive surface to peel off from the phone easily. 103 is a moving part, the middle of 103 bends to create the closed stable state, and hence attaching it directly to the back of a phone by adding adhesive material won't have much durability. In other words, if 105 is not used and 103 is attached directly to 104, the amount of stress added to 104 will increase. Instead of using adhesive pads, suction cups can also be used for attaching 103 to the back of a mobile phone.

A piece of magnet can be incorporated to approximately middle of the bistable spring and a metallic plate can be attached to back surface of said mobile phone through an adhesive surface. In such embodiment, the bistable spring can be connected to said mobile phone through the magnetic force between said magnet and said metallic plate. 103 can be a one-piece bistable spring or a plurality of pieces of bistable springs connected together through patches. For example, 103 can comprise of two pieces of bistable spring connected to each side of 105 to create similar functionality that a one-piece bistable spring provides. This disclosure covers all of these implementations, as the functionality would not differ in case the bistable spring is made of several pieces of bistable springs connected together.

As FIG. 2 A. illustrates, the mobile phone holder is attached to the back of a mobile phone, 201, through 104. As FIG. 2 B. illustrates, for mounting the mobile phone to the dashboard of a car, the user, 204, pushes the mobile phone, 205, toward the air vent, 203, on the dashboard of the car, 202, and with his/her other hand applies forces of 107 to lock the mobile phone holder. As FIG. 2 C. illustrates, the mobile phone holder mounts the phone to the dashboard through the air vent bars.

An additional advantage of this the mobile phone holder is providing a loop for holding the phone by a finger of the user, as illustrated in FIG. 3.

In addition to air vent bars, apparatus of FIG. 1 A. can be used for mounting a mobile phone to a finger of a user, handlebar of a shopping cart, handlebar of a bike, safety belt of a car, a belt loop, strap of a bag, belt of a user, or other accessories of a user.

In the case of not including 101 and 102 the apparatus of FIG. 1 A. can be mounted to air vents that have two layers of bars with one layer consists of vertical bars and the other layer consists of horizontal bars, as illustrated in FIG. 8. A. For mounting the mobile phone, the user needs to push the two end arms of 103 inside air vent and sandwich the two arms between the two layers of the air vent bars to create a semi-closed loop, as illustrated in FIG. 8. A. The reason that the phone would not fall in such a scenario is due to the fact that the two end arms of the bistable spring will be connected through friction forces that are formed between the two end arms of the bistable spring, and the friction forces that are formed between the two end arms of the bistable spring and the air vent bars. These friction forces are formed as a result of the pressure that is applied by the bars of the air vent to the arms of the bistable spring. The natural forces in the bistable spring that are toward bringing back the bistable spring to its semi-closed state intensify the friction between the arms of the bistable spring and air vent bars. For assisting the friction forces in keeping the loop of bistable spring closed and sandwiched between the two sets of air vent bars, tongues and grooves, or dents and teeth, or hook-and-loop fasteners can be added to the arms of the bistable spring. End arms of the bistable spring can be magnetized as well. In addition, for increasing the friction forces between the arms of said bistable spring and air vent bars, said bistable spring can be coated with elastic materials, such as rubber.

As FIG. 4 A. illustrates, the apparatus can be integrated into the case, or a protective cover, of a mobile phone directly. For this aim, approximately the middle of 103 can either be sandwiched between two layers of the case of the mobile phone or be directly incorporated into the case of the mobile phone. The apparatus can also be integrated into other accessories such as mobile phone wallets and attachable card holders.

In addition, this apparatus can replace the air vent bar holding clamps of conventional mobile phone holders. This apparatus can be incorporated into conventional magnetics and clamp-like phone holders that were mentioned in the prior art section. In this way such mobile phone holders can be mounted to the air vent bars through this apparatus. Since this apparatus creates a closed loop around the air vent bars, it increases the reliability of said conventional magnetic and clamp-like phone holders.

A more general embodiment of the apparatus of FIG. 1. A with an adjustable diameter of the locked loop can be achieved by embedding several hallow frames (several 102s) and/or several fastening devices (several 101s) instead of only one. In this case, for decreasing the diameter of the closed loop, the hollow frames and the fastening devices that are farther from the ends of 103 (closer to the middle of 103) shall be locked into each other by the user.

For providing a larger adhesive surface, and hence a more durable product, 104 is proposed to be larger than 105, as it is illustrated in FIG. 5. A, B, C.

FIG. 5 A. Illustrates the apparatus of FIG. 1 A. in its half-closed stable state wherein magnetic snap buttons, or magnets, are utilized for providing the locked state. The reason behind proposing magnetic snap buttons, or magnets, over regular snaps, or regular buttons, or other types of fastening devices, is as follows. The two end arms of 103 meet each other inside the air vent and hence, the user cannot apply a sufficient amount of force needed to close regular buttons. Also, the user will have a low amount of visibility when the two end arms of 103 are inside the air vent. The magnetic force between the two parts of the magnetic snap buttons, or magnets, will cause the two parts of the magnetic snap buttons, or magnets, to get attached to each other without needing additional force to be applied by the user. Accurate placement and control of the magnetic snaps, or magnets, will not be needed by the user as the magnetic force guides the two part of magnetic snap buttons, or magnets, toward each other. For mounting the mobile phone to the air vent, the user pushes the two end arms of 103 into the air vent around at least one bar of the air vent. Then the user applies the forces of 107 until the faces of the two magnetic snap buttons, or magnets, come to the proximity of each other. When the faces of the two magnetic snap buttons, or magnets, come to the proximity of each other, the magnetic force between them guides them into getting attached to each other. FIG. 5 C. illustrates this apparatus in its locked state and FIG. 5 E. illustrates this apparatus mounting a mobile phone to the air vent of a car. For opening the loop, the user needs to push apart the arms of 103 by applying forces 112 which are in the opposite directions of forces 107. For the air vent bars that are dense, applying forces 112 might not be easy due to the fact that the adjacent air vent bars limit the amount of space that the two arms of 103 can be separated by the user. For solving this problem and enhancing the user experience, two additional straps, or wires, are attached to the back of the magnetic snaps, or magnets, as illustrated in FIG. 5 F. by 503. These straps, or wires, stay outside of the air vent and when the user needs to open the closed loop formed behind the air vent, the user pulls these straps, or wires. As a result, the magnetic snap buttons, or magnets, get detached from each other.

For making it easier for the user to place the magnets, or magnetic snap buttons, inside the air vent, rectangular magnets, or magnetic snap buttons, can be used instead of circular magnetic snap buttons, or magnets. In case the bistable spring is made of metal, the end arms of the bistable spring can be magnetized and directly be used as magnets as well.

501 and 502 do not need to be both permanent magnets. As long as one of them is permanent magnet and the other one is made of metallic material that can be attracted to the magnet, similar functionality will be achieved. Metallic materials that are attracted to the magnets become magnets under magnetic fields. Hence, even though one of 501 and 502 can be impermanent magnet, they both will be magnets when attached to each other. Thus, in this disclosure both 501 and 502 are called magnets.

As an additional advantage, this apparatus provides a loop for holding the phone by hand as FIG. 5 D. illustrates.

This apparatus can also be integrated into the case of a mobile phone, or accessories such as mobile phone protective covers, wallets, and attachable card holders.

This apparatus can replace clamps that connect conventional mobile phone holders to an air vent bar. In the prior art section, it was mentioned that conventional magnetic and clamp-like phone holders are attached to the air vent bars through clamps, not closed loops. Since this apparatus creates a closed loop around the air vent bars, it increases the reliability of said conventional magnetic and clamp-like phone holders.

In addition to air vent bars, apparatus of FIG. 5 A. can be used for mounting a mobile phone to a finger of a user, a handlebar of a shopping cart, a handlebar of a bike, safety belt of a car, a belt loop, strap of a bag, a belt of a user, or other accessories of a user.

One implementation of the mobile phone holder of FIG. 5 A. is illustrated in FIG. 5 H. On one end arm of the bistable spring two metallic plates, 504, are integrated. On the other end arm a metallic piece, 505, is integrated. At least one of said two metallic plates or said metallic piece is permanent magnet. For creating the closed loop, the user pushes 505 into 504. The magnetic force between 505 and 504 keeps the loop closed until the user applies forces of 112, toward opening the closed loop.

As FIG. 5 I. illustrates, 501 and 502 can be positioned in the way that their surfaces that are in parallel to the surface of the bistable spring get attached to each other. As FIG. 5 J. and FIG. 5 K. illustrate, 501 and 502 can be designed in the way that they get attached to one another on two sides for providing higher amount of magnetic force.

FIG. 6 A. illustrates a phone holder wherein a piece of strap, 601, and a pair of magnetic snap buttons, or magnets, 602 and 603, are used for creating a loop. For making it easier for the user to place the magnets, or magnetic snaps buttons, inside the air vent, rectangular magnets, or rectangular magnetic snaps buttons, can be used instead of circular magnetic snaps buttons, or magnets. 601 is attached to the back of the phone through 604. 601 can also be directly integrated into the back case of a mobile phone, or protective cover of the mobile phone, or accessories such as phone wallets.

The apparatus of FIG. 6 A. can replace the air vent holding clamps of the conventional mobile phone holders and be incorporated into conventional magnetic and clamp-like phone holders that were mentioned in the prior art section. Since this apparatus creates a closed loop around the air vent bars, it can increase the reliability of said conventional magnetic and clamp-like phone holders.

601 can be more than one pieces of strap. In such a case, pieces of straps are connected to each other through patches to create one piece as a whole. For example, 601 can be two pieces of straps connected to two sides of 604. Since the functionality of one-piece strap and several pieces of straps that are connected through patches are similar, in this disclosure, several pieces of straps that are connected through patches are considered as a one-piece strap as well.

Similar advantages to those of the phone holder of FIG. 5 A. and FIG. 1 A. can be achieved by the phone holder of FIG. 6 A. However, unlike a bistable spring, a piece of strap does not have an open straight stable mode. Hence, for keeping the strap straight, parallel, attached to the mobile phone and protected when the closed loop is not needed, attaching devices, illustrated in 605, are considered. These attaching devices can be magnets, hook-and-loop fasteners, clips, buttons, small pockets or etc.

In addition to air vent bars, apparatus of FIG. 6 A. can be used for mounting a mobile phone to a finger of a user, handlebar of a shopping cart, handlebar of a bike, safety belt of a car, a belt loop, strap of a bag, belt of a user, or other accessories of a user.

One implementation of the phone holder of FIG. 6 A. is illustrated in FIG. 6 C. On one end arm of the strap two metallic plates, 606, are integrated. On the other end arm a metallic piece, 607, is integrated. At least one of said two metallic plates or said metallic piece is permanent magnet. For creating the closed loop, the user pushes 607 into 606. The magnetic force between 606 and 607 keeps the loop closed until the user applies opening forces, 112, toward opening the closed loop. 602 and 603 do not need to be both permanent magnets. As long as one of them is permanent magnet and the other one is made of metallic material that can be attracted to the magnet, similar functionality will be achieved. Metallic materials that are attracted to the magnets become magnets under magnetic fields. Hence, even though one of 602 and 603 can be impermanent magnet, they both will be magnets when attached to each other. Thus, in this disclosure both 602 and 603 are called magnets.

As FIG. 6 D. illustrates, 602 and 603 can be positioned in the way that their surfaces that are parallel to the surface of the strap get attached to each other. In a similar way that FIG. 5 J. and FIG. 5 K. illustrate, 602 and 603 can be designed in the way that they get attached to one another on two sides for providing higher amount of magnetic force.

As FIG. 7 illustrates, the sides of the magnets, 702 and 703, that face the air vent bar, 705, can be manufactured tilted, or with dents, so that when the user pulls the mounted mobile phone toward detaching it from the air vent, the applied force by the user, 704, causes the air vent bar, 705, to push the two pieces of magnets, 702 and 703, apart and toward getting detached from each other.

FIG. 8 A. Illustrates the apparatus of FIG. 1 A. wherein 101 and 102 are omitted. In this embodiment, the friction force between the two arms of 103 keep 103 in a closed loop state and attached to air vent bars. The two arms of 103 are sandwiched between two sets of air vent bars. FIG. 8 B. Illustrates the apparatus of FIG. 8 A. mounting a mobile phone to an air vent bar on the dashboard of a car. This method of mounting a mobile phone to air vent bars through a bistable spring is achievable where a second set of air vent bars exists behind the outside air vent bars. In most of the automotive vehicles, the structure of air vents comprises of two sets of air vent bars that are placed in the air vent within a slight distance from each other. Hence, this method can be implemented in most of the automotive vehicles. For mounting the mobile phone to the air vent through this method, the user needs to push two arms of the bistable spring inside the air vent and sandwich the two arms of the bistable spring between the mentioned two sets of air vent bars, as shown in FIG. 8 A.

As FIG. 9. A. illustrates, fastening devices similar to brass fasteners or money clips, 901, can be used for attaching the mobile phone to air vent bars, 902, through said bistable spring, 103, or said strap, 601. In this figure, said bistable spring, or said strap, is shown by 701. For attaching the phone holder of FIG. 9. A. to air vent bars, first the user needs to push end arms of 701 inside the air vent and then adjust the openings of 901s in front of air vent bars and after that clip the air vent bars into 901s.

FIG. 9. B. illustrates a similar phone holder to that of FIG. 9. A. However, in FIG. 9. B. the openings of the fasteners, 901s, are normally facing the air vent.

Although in FIG. 9. A. and FIG. 9. B. two 901s are illustrated, one 901 would be sufficient to attach the apparatus to the air vent As FIG. 9. C. illustrates, bars, plates, or generally speaking taps, 903, can be used to attach the strap, or bistable spring, to air vent bars. For attaching the strap, or bistable spring, to air vent bars the user needs to push the arms of the strap, or bistable spring, inside the air vent and trap the air vent bars between the taps, 903, and the strap, or bistable spring.

Although in FIG. 9. C. two 903s are illustrated, one 903 would be sufficient to attach the apparatus to the air vent.

As FIG. 9. D. illustrates, two parallel plates, or two rings that are positioned in parallel to each other, 904, so that an air vent bar can be placed in between them, can be used instead of brass fasteners. The advantage of using rings is that they can provide means for holding the mobile phone by the fingers of the user as well. For attaching the strap, or the bistable spring, to air vent bars the user needs to place 904 in front of an air vent bar, push 904 toward the air vent bar and sandwich the air vent bars, 902, in between the two plates, or rings, 904. Said two parallel plates, or two rings, can be coated with elastic material such as rubber for increasing the friction and for preventing scratches on the air vent bars.

As FIG. 9. E. illustrates, although in FIG. 9. D. two 904s are illustrated, one 904 would be sufficient to attach the phone holder to the air vent. That is also the case for the embodiments of FIG. 9. A., FIG. 9. B., and FIG. 9. C.

As FIG. 10 A. illustrates, the apparatus of FIG. 1 A. can be used as a general-purpose fastener. In this case, 104 and 105 can be omitted. Such general-purpose fastener can be used for fastening and hanging objects. In addition, it can be used as a bracelet, a toy, strap of a watch, and etc.

Advantages of such general-purpose fastener are as follows. Since in open stable state a bistable spring is straight, a plurality of bistable springs in their open stable states occupy the lowest amount of space when storing in a place together. An additional advantage is the fact that using a bistable spring as a bracelet, a toy, a fastener, etc. is entertaining for the user.

FIG. 10 B. illustrates an example wherein the general-purpose fastener of FIG. 10 A. is used for fastening objects together. FIG. 10 C. illustrates an example wherein the general-purpose fastener of FIG. 10 A. is used as a toy or a bracelet. FIG. 10 D. illustrates an example wherein the general-purpose fastener of FIG. 10 A. is used for hanging an object from a bar. FIG. 10 E. illustrates an example wherein the general-purpose fastener of FIG. 10 A. is used for fastening objects together. Although the description above contains many specifications, these should not be construed as limiting the scope of the embodiments but as merely providing illustrations of some of several embodiments. Many other ramifications and variations are possible within the teachings of the various embodiments. For example, as a demonstration of the feasibility of the invention, the applications are shown for holding mobile phones whereas it can also be used for holding other handheld devices such as a GPS device. Or, fastening devices and magnets that fasten two end arms of said bistable spring, or strap, can be manufactured in different shapes, providing similar functionalities. Thus, the scope of the invention should be determined by the appended claims and their legal equivalents, rather than by the examples given.

The invention claimed is:

1. An apparatus for mounting a handheld device to an air vent, said air vent having an air vent bar, or a plurality of air vent bars, comprising:
   (a) a spring structure, or a curved structure with elasticity capability, having two free ends and a middle portion between the two ends, wherein said spring structure, or said curved structure with elasticity capability, is made in one piece or formed by several pieces connected through one patch or a plurality of patches;
   (b) a fastening means for fastening the two free ends of said spring structure, or said curved structure with elasticity capability, to one another for creating a loop around said air vent bar, or said plurality of air vent bars;
   (c) a connecting means for attaching said spring structure to said handheld device; and
   (d) whereby said spring structure, or said curved structure with elasticity capability, has a first half-closed loop stable state in which the two free ends of said spring structure, or said curved structure with elasticity capability, are biased toward the opposite free end, and a second locked stable state whereby said fastening means secure said free ends together such that said spring structure, or said curved structure with elasticity capability, goes around said air vent bar, or said plurality of air vent bars and attaches said handheld device to said air vent bar, or said plurality of air vent bars.

2. The apparatus of claim 1, further comprising holding means for attaching the free ends of said spring structure, or said curved structure with elasticity capability, to a back surface of said handheld device, for holding the free ends of said spring structure, or said curved structure with elasticity capability, approximately parallel with the back surface of the handheld device, thereby providing protection to said spring structure, or said curved structure with elasticity capability, and enhancing the user experience by saving space through keeping the free ends of said spring structure, or said curved structure with elasticity capability, straight and approximately parallel with the back surface of the handheld device during said first half-closed loop stable state in which the two free ends are free from each other.

3. The apparatus of claim 1, wherein said fastening means is a hole, or a dent, located on one free end of said spring structure, or said curved structure with elasticity capability, and a hook, an arrow shaped fastener, or a swollen part located on the opposite free end that can be trapped in said hole, or said dent, for creating a closed loop with said spring structure, or said curved structure with elasticity capability, wherein natural forces in the structure that bring the structure back to its half-closed loop stable state create outward forces thereby pushing said hook, arrow shaped fastener, or swollen part against an edge, or a side, of said hole, or dent, such that said hook, arrow shaped fastener, or swollen part, stays trapped in said hole, or dent, providing the user control of securing said free ends to each other and opening said free ends from each other inside said air vent, such that fingers of the user manipulate portions of said free ends that remain outside of said air vent.

4. The apparatus of claim 1, wherein said fastening means is a plurality of holes, or dents, located on one free end of said spring structure, or said curved structure with elasticity capability, and a hook, an arrow shaped fastener, or a swollen part located on the opposite free end, wherein a closed loop is formed by trapping the hook, arrow shaped fastener, or swollen part in at least one of the holes, or the dents, and wherein the diameter of the closed loop can be decreased or increased by using at least one hole, or one dent, that is closer to or farther away from the middle portion of said spring structure, or said curved structure with elasticity capability.

5. The apparatus of claim 1, wherein said fastening means is a hole, or a dent, located on one free end of said spring structure, or said curved structure with elasticity capability, and a plurality of hooks, arrow shaped fasteners, or swollen parts located on the opposite free end, wherein a closed loop is formed by trapping the hooks, arrow shaped fasteners or swollen parts in said hole, or said dent, and wherein the diameter of the closed loop can be decreased or increased by using at least one of the of hooks, arrow shaped fasteners, or swollen parts that is closer to or farther away from the middle portion of said spring structure, or said curved structure with elasticity capability.

6. The apparatus of claim 1, wherein said fastening means is a pair of magnets, or magnetic snap buttons, or at least one piece of magnet and at least one metallic piece, which are located on the ends of said spring structure, or said curved structure with elasticity capability, thereby providing force to keep said spring structure, or said curved structure with elasticity capability, in a closed loop shape and providing the user control of locking said spring structure, or said curved structure with elasticity capability, around said air vent bar, or said plurality of air vent bars, and opening said spring structure, or said curved structure with elasticity capability, from said air vent bar, or said plurality of air vent bars.

7. The apparatus of claim 6, wherein a strap, a wire, or a plurality of straps or wires are secured to a back of each of said magnets, or magnetic snap buttons, or said at least one piece of magnet and at least one metallic piece, thereby providing the user means for opening said magnets, or magnetic snap buttons, or at least one piece of magnet and at least one metallic piece from each other through pulling said straps or wires apart from each other.

8. The apparatus of claim 1, wherein said spring structure, or said curved structure with elasticity capability, is coated with an elastic material, wherein the elastic material coating creates friction forces between the ends of said spring structure, or said curved structure with elasticity capability, and said air vent bar, or said plurality of air vent bars, thereby providing additional force for keeping said handheld device mounted to said air vent firmly.

9. The apparatus of claim 1, wherein said connecting means comprises an adhesive pad, or a suction cup attached to said middle portion of said spring structure, or said curved structure with elasticity capability, wherein the adhesive pad or suction cup adheres to a back surface of said handheld device.

10. The apparatus of claim 1, wherein said connecting means comprises a protective case or a back cover lid attached to said spring structure, or said curved structure with elasticity capability, the connecting means allowing the handheld device to be attached to said spring structure, or said curved structure with elasticity capability.

11. The apparatus of claim 1, wherein said connecting means comprises a protective case, or a back cover lid, wherein said protective case, or said back cover lid, comprises a bar, a plate, a clamp, or a clip such that said bar, plate, clamp, or clip holds said spring structure, or said curved structure with elasticity capability, the connecting means allowing said handheld device to be attached to said spring structure, or said curved structure with elasticity capability.

12. The apparatus of claim 1, wherein said connecting means comprises a bar, a plate, a clamp, or a clip, that is attachable to said handheld device, and wherein said bar, plate, clamp, or clip holds said spring structure, or said curved structure with elasticity capability, the connecting means allowing said handheld device to be attached to said spring structure, or said curved structure with elasticity capability.

13. The apparatus of claim 1, wherein said connecting means comprises a card holding wallet attached to said spring structure, or said curved structure with elasticity capability, the connecting means allowing the handheld device to be attached to said spring structure, or said curved structure with elasticity capability.

14. The apparatus of claim 1, wherein said fastening means comprises two metallic plates that are positioned on one of said free ends of said spring structure, or said curved structure with elasticity capability, and a metallic piece that is positioned at the other free end of said spring structure, or said curved structure with elasticity capability, wherein at least one of said two metallic plates or said metallic piece is a permanent magnet, wherein said metallic piece is placed between said two metallic plates and is attached to at least one of said metallic plates through magnetic force thereby keeping said spring structure, or said curved structure with elasticity capability, in a closed loop shape.

15. An apparatus for mounting a handheld device to an air vent, said air vent having an air vent bar, or a plurality of air vent bars, comprising:
 (a) a spring structure, or a curved structure with elasticity capability, having at least one free end and a body portion, wherein said spring structure, or said curved structure with elasticity capability, is made in one piece or formed by several pieces connected through one patch or a plurality of patches;
 (b) a clip attached to said free end of said spring structure, or said curved structure with elasticity capability, for attaching said spring structure, or said curved structure with elasticity capability, to said air vent bar or bars;
 (c) a connecting means for attaching said spring structure, or said curved structure with elasticity capability, to said handheld device; and
 (d) whereby said spring structure, or said curved structure with elasticity capability, has a first free curved state in which the free end of said spring structure, or said curved structure with elasticity capability, is biased toward said body portion of said spring structure, or said curved structure with elasticity capability, and a locked state whereby said clip is secured to said air vent bar or bars to attach said handheld device to said air vent.

16. The apparatus of claim 15, wherein said clip comprises a brass fastener, a money clip, a clamp, one plate, one bar, two plates that are positioned in parallel to each other, or two rings that are positioned in parallel to each other, whereby said air vent bar, or said plurality of air vent bars, is sandwiched between said brass fastener, said money clip, said clamp, said one plate and said free end, said one bar and said free end, said two plates, or said two rings by the user for connecting said spring structure, or said curved structure with elasticity capability, to said air vent.

17. The apparatus of claim 15, further comprising holding means for attaching the free end of said spring structure, or said curved structure with elasticity capability, to a back surface of said handheld device, for holding the free end of said spring structure, or said curved structure with elasticity capability, approximately parallel with the back surface of the handheld device, providing protection to said spring structure, or said curved structure with elasticity capability, and enhancing the user experience by saving space through keeping the free end of said spring structure, or said curved structure with elasticity capability, straight and approximately parallel with the back surface of the handheld device during said first free curved state in which the free end is free from said air vent.

18. The apparatus of claim 15, wherein said spring structure, or curved structure with elasticity capability, is a bistable spring capable of maintaining a straight stable state in which the free end is approximately parallel with a back surface of the handheld device, providing protection to said spring structure, or curved structure with elasticity capability, and enhancing the user experience by saving space through keeping said spring structure, or said curved structure with elasticity capability, straight and approximately parallel with the back surface of the handheld device when the free end is free from said air vent or in other words when said apparatus is not used for mounting said handheld device to said air vent.

19. The apparatus of claim 15, wherein said connecting means comprises an adhesive pad, or a suction cup attached to said body portion of said spring structure, or said curved structure with elasticity capability, wherein the adhesive pad or suction cup adheres to a back surface of said handheld device.

20. The apparatus of claim 15, wherein said connecting means comprises a protective case or a back cover lid attached to said spring structure, or said curved structure with elasticity capability, the connecting means allowing the handheld device to be attached to said spring structure, or said curved structure with elasticity capability.

21. The apparatus of claim 15, wherein said connecting means comprises a protective case, or a back cover lid, wherein said protective case, or said back cover lid, comprises a bar, a plate, a clamp, or a clip such that said bar, plate, clamp, or clip holds said spring structure, or said curved structure with elasticity capability, the connecting means allowing said handheld device to be attached to said spring structure, or said curved structure with elasticity capability.

22. The apparatus of claim 15, wherein said connecting means comprises a holding bar, a holding plate, a holding clamp, or a holding clip, that is attachable to said handheld device, and wherein said holding bar, holding plate, holding clamp, or holding clip holds said spring structure, or said curved structure with elasticity capability, the connecting means allowing said handheld device to be attached to said spring structure, or said curved structure with elasticity capability.

23. A method for mounting a handheld device to an air vent of a car comprising:
   a. providing a spring structure, or a curved structure with elasticity capability, having two free ends and a middle portion between the two ends, wherein the structure is made in one piece or formed by several pieces connected through one patch or a plurality of patches, whereby said structure has a stable state in which the two ends of the structure are biased toward the opposite free end to form a half-closed stable loop shape wherein the two free ends may or may not touch or cover each other;
   b. attaching said handheld device to said middle portion of said structure through a connecting means; and
   c. placing the two free ends of the structure in a space between, or outside, two air vent bars of said air vent such that said two air vent bars are positioned outside, or inside, said structure, whereby the two air vent bars apply forces on the two ends in a direction toward bringing the two ends closer toward, or farther from, one another so that natural forces in said spring structure, or said curved structure with elasticity capability, that bring the structure back to its half-closed loop stable state create outward, or inward, forces on the air vent bars, whereby the outward, or inward, forces create a friction force between the two ends and said air vent bars so that said structure stays attached to the air vent and thereby said handheld device is mounted to said air vent.

24. The method of claim 23, further comprising providing holding means for holding the free ends of said spring structure, or said curved structure with elasticity capability, in a straight stable state in which the free ends are approximately parallel with a rear surface of the handheld device, providing protection to said spring structure, or said curved structure with elasticity capability, and enhancing the user experience by saving space through keeping said structure, or said curved structure with elasticity capability, straight and approximately parallel with the rear surface of the handheld device when the apparatus is not used for mounting said handheld device to said air vent.

25. The method of claim 23, further comprising sandwiching the free ends in a space between a first set of air vent bars and a second set of air vent bars wherein said second set of air vent bars are located behind said first set of air vent bars.

26. An apparatus for mounting a handheld device to an air vent, said air vent having an air vent bar, or a plurality of air vent bars, comprising:
   (a) a strap having two free ends and a middle portion between the two ends, wherein the strap is made in one piece or formed by several pieces connected through one patch or a plurality of patches;
   (b) a fastening means for fastening the two free ends of said strap to each other for creating a loop around said air vent bar, or said plurality of air vent bars;
   (c) a connecting means for attaching said strap to said handheld device;
   (d) a guiding string, a guiding wire, a plurality of guiding strings, a plurality of guiding wires, or a plurality of guiding strings and guiding wires secured to a back of one or each of said fastening means thereby providing the user means for securing said fastening means to each other by guiding the fastening means to get trapped, or attached, to one another for attaching said handheld device to said air vent through creating a closed loop around said air vent bar, or said plurality of air vent bars, which requires securing the free ends to each other inside said air vent where the fingers of the user have no direct access to, and thereby providing the user means for opening said closed loop by untrapping, or detaching, said fastening means, that are located inside said air vent, from each other, by manipulating portions of the guiding string, guiding wire, guiding strings, or guiding wires that remain outside said air vent; and
   (e) whereby said strap has a first open state in which the two free ends of said strap are free from each other and a second locked state whereby said fastening means secure said free ends together such that said strap goes around said air vent bar, or said plurality of air vent bars, and attaches said handheld device to said air vent bar, or said plurality of air vent bars.

27. The apparatus of claim 26, further comprising holding means for attaching the free ends of said strap to a back surface of said handheld device, for holding the free ends of said strap approximately parallel with the back surface of the handheld device, thereby providing protection to said strap and enhancing the user experience by saving space through keeping the free ends of said strap straight and approximately parallel with the back surface of the handheld device during said first open state in which the two free ends of said strap are free from each other.

28. The apparatus of claim 26, wherein said fastening means is a pair of magnets, or magnetic snap buttons, or at least one piece of magnet and at least one metallic piece, which are located on the ends of said strap thereby providing force to keep said strap in a closed loop shape and providing the user control of locking said strap around said air vent bar, or said plurality of air vent bars, and opening said strap from said air vent bar, or said plurality of air vent bars.

* * * * *